US012748901B2

(12) United States Patent
Mehr et al.

(10) Patent No.: US 12,748,901 B2
(45) Date of Patent: Sep. 29, 2026

(54) DETERMINING A 3D MODELED OBJECT DEFORMATION

(71) Applicant: DASSAULT SYSTEMES, Velizy-Villacoublay (FR)

(72) Inventors: Eloi Mehr, Velizy-Villacoublay (FR); Ariane Jourdan, Velizy-Villacoublay (FR)

(73) Assignee: DASSAULT SYSTEMES, Velizy-Villacoublay (FR)

( * ) Notice: Subject to any disclaimer, the term of this patent is extended or adjusted under 35 U.S.C. 154(b) by 1257 days.

(21) Appl. No.: 17/185,795

(22) Filed: Feb. 25, 2021

(65) Prior Publication Data

US 2021/0264079 A1 Aug. 26, 2021

(30) Foreign Application Priority Data

Feb. 25, 2020 (EP) .................................... 20305177

(51) Int. Cl.
*G06F 30/23* (2020.01)
*G06F 17/11* (2006.01)
(Continued)

(52) U.S. Cl.
CPC .............. *G06F 30/23* (2020.01); *G06F 17/11* (2013.01); *G06F 18/24* (2023.01); *G06F 30/20* (2020.01);
(Continued)

(58) Field of Classification Search
CPC .......... G06F 30/23; G06F 17/11; G06F 18/24; G06F 30/20; G06F 30/27; G06F 2111/04;
(Continued)

(56) References Cited

U.S. PATENT DOCUMENTS

| | | | |
|---|---|---|---|
| 9,978,177 | B2 | 5/2018 | Mehr et al. |
| 2015/0030238 | A1 | 1/2015 | Yang et al. |

(Continued)

FOREIGN PATENT DOCUMENTS

| | | | |
|---|---|---|---|
| CN | 107067473 | A | 8/2017 |
| JP | 2000-90272 | A | 3/2000 |

(Continued)

OTHER PUBLICATIONS

Kurenkov, Andrey, et al. "Deformnet: Free-form deformation network for 3d shape reconstruction from a single image." 2018 IEEE Winter Conference on Applications of Computer Vision (WACV). IEEE, 2018. (Year: 2018).*

(Continued)

*Primary Examiner* — John E Johansen
(74) *Attorney, Agent, or Firm* — Oblon, McClelland, Maier & Neustadt, L.L.P.

(57) ABSTRACT

Described is a computer-implemented method for determining a 3D modeled object deformation. The method comprises providing a deformation basis function configured for inferring a deformation basis of an input 3D modeled object. The method further comprises providing a first 3D modeled object. The method further comprises providing a deformation constraint of the first 3D modeled object. The method further comprises determining a second 3D modeled object which respects the deformation constraint. The determining of the second 3D modeled object comprises computing a trajectory of transitional 3D modeled objects between the first 3D modeled object and the second 3D modeled object. The trajectory deforms each transitional 3D modeled object by a linear combination of the result of applying the deformation basis function to the transitional 3D modeled object. The trajectory reduces a loss penalizing an extent of non- (Continued)

respect of the deformation constraint by the deformed transitional 3D modeled object.

17 Claims, 4 Drawing Sheets

(51) Int. Cl.

| | |
|---|---|
| ***G06F 18/24*** | (2023.01) |
| ***G06F 30/20*** | (2020.01) |
| ***G06F 30/27*** | (2020.01) |
| ***G06F 111/10*** | (2020.01) |
| ***G06F 111/20*** | (2020.01) |
| ***G06N 3/044*** | (2023.01) |
| ***G06N 3/045*** | (2023.01) |
| ***G06N 3/084*** | (2023.01) |
| ***G06T 19/20*** | (2011.01) |
| *G06F 111/04* | (2020.01) |
| *G06F 119/14* | (2020.01) |

(52) U.S. Cl.
CPC ............ *G06F 30/27* (2020.01); *G06N 3/044* (2023.01); *G06N 3/045* (2023.01); *G06N 3/084* (2013.01); *G06F 2111/04* (2020.01); *G06F 2111/10* (2020.01); *G06F 2111/20* (2020.01); *G06F 2119/14* (2020.01); *G06T 19/20* (2013.01); *G06T 2219/2021* (2013.01)

(58) Field of Classification Search
CPC ............. G06F 2111/10; G06F 2111/20; G06F 2119/14; G06N 3/044; G06N 3/045; G06N 3/084; G06T 19/20; G06T 2219/2021
USPC ............................................................. 703/2
See application file for complete search history.

(56) References Cited

U.S. PATENT DOCUMENTS

| | | | | |
|---|---|---|---|---|
| 2017/0193699 | A1* | 7/2017 | Mehr | G06F 17/10 |
| 2019/0392653 | A1 | 12/2019 | Varanasi et al. | |

FOREIGN PATENT DOCUMENTS

| | | | |
|---|---|---|---|
| JP | 2010-211680 | A | 9/2010 |
| JP | 2017-120648 | A | 7/2017 |
| JP | 2017-215844 | A | 12/2017 |
| JP | 2019-96130 | A | 6/2019 |
| WO | WO 2019 /103010 | A1 | 5/2019 |

OTHER PUBLICATIONS

Mehr, Eloi, et al. "DiscoNet: Shapes learning on disconnected manifolds for 3D editing." Proceedings of the IEEE/CVF International Conference on Computer Vision. 2019. (Year: 2020).*
Japanese Office Action issued Sep. 24, 2024 in Japanese Patent Application No. 2021-011110 (with unedited computer-generated English translation)., 7 pages.
Julien Mairal, et al.; "Sparse Modeling for Image and Vision Processing"; New Foundations and Trends; arXiv:1411.3230v2; [cs.CV]; Dec. 6, 2014; 202 pgs.
Eloi Mehr, et al.; "DiscoNet: Shapes Learning on Disconnected Manifolds for 3D Editing"; 2019 IEEE/CVF International Conference on Computer Vision (ICCV), IEEE, Oct. 27, 2019; XP033723308; [retrieved on Feb. 24, 2020]; 10 pgs.
Charles R. Qi, et al.; "PointNet: Deep Learning on Point Sets for 3D Classification and Segmentation"; Conference on Computer Vision and Pattern Recognition (CVPR); 2017; 9 pgs.
Weiyue Wang, et al.; "3DN: 3D Deformation Network"; Conference on Computer Vision and Pattern Recognition (CVPR); 2019; 9 pgs.
Volker Blanz, et al.; "A Morphable Model for the Synthesis of 3D Faces"; Siggraph; 1999; 8 pgs.
Thibault Groueix, et al.; "AtlasNet: a Papier-Mache Approach to Learning 3D Surface Generation"; Computer Vision and Pattern Recognition (CVPR); 2018; 16 pgs.
Rana Hanocka, et al; "MeshCNN: A Network with an Edge"; ACM Trans. Graph.; vol. 1, No. 1; Article Publication date: Feb. 2019; 12 pgs.
Dominic Jack, et al.; "Learning Free-Form Deformations for 3D Object Reconstruction"; Asian Conference on Computer Vision (ACCV); 2018; 16 pgs.
Iasonas Kokkinos, et al.; "Unsupervised Learning of Object Deformation Models"; International Conference in Computer Vision (ICCV); 2007; 9 pgs.
Extended European Search Report issued Aug. 7, 2020 in Europe Patent Application No. 20305081.0-1203; 10 pgs.
Anastasia Dubrovina, et al.; "Composite Shape Modeling via Latent Space Factorization": 2019 IEEE/CVF International Conference on Computer Vision (ICCV); 10 pgs.
M. Ersin Yumer, et al.; "Learning Semantic Deformation Flows with 3D Convolutional Networks"; ECCV 2016; Part VI; LNCS 9910; 18 pgs.
Christodoulidis Stergios, et al.; "Linear and Deformable Image Registration with 3D Convolutional Neural Networks"; Pervasive: International Conference on Pervasive Computing; [Lectures Notes in Computer Science; Lect. Notes Computer]; Springer, Berlin; Heidelberg; XP047485133; [retrieved on Sep. 12, 2018]; Sep. 12, 2018; 10 pgs.
Qingyang Tan, et al.; "Variational Autoencoders for Deforming 3D Mesh Models"; arxiv.org; Cornell University Library 201 Olin Library Cornell University Ithaca, NY 14853; Sep. 13, 2017; XP081309912; 10 pgs.
Andrey Kurenkov, et al.; "DeformNet: Free-Form Deformation Network for 3D Shape Reconstruction from a Single Image"; 2018 IEEE Winter Conference on Applications of Computer Vision; 9 pgs.
Extended Search Report issued Jul. 24, 2020 in Europe Patent Application No. 20305177.6-1230; 7 pgs.
Office Action issued Nov. 12, 2024, in corresponding Japanese Patent Application No. 2021-011113 (with English Translation), 5 pages.
Office Action issued Jan. 21, 2025, in corresponding Japanese Patent Application No. 2021-011110 (with English Translation), 4 pages.
Office Action dated Sep. 16, 2025, issued in counterpart CN Application No. 202110191305.5, with English translation. (19 pages).
Office Action dated Jul. 18, 2025, issued in CN Application No. 202110108146.8, with English Translation. (18 pages).
Yang et al, "Seventy Years Beyond Neural Networks: Retrospect and Prospect", Chinese Journal of Computers, vol. 39, No. 8, Jan. 15, 2016, 22 pages (with English Abstract).

* cited by examiner

DETERMINING A 3D MODELED OBJECT DEFORMATION

CROSS-REFERENCE TO RELATED APPLICATIONS

This application claims priority under 35 U.S.C. § 119 or 365 to European Application No. 20305177.6, filed Feb. 25, 2020. The entire contents of the above application(s) are incorporated herein by reference.

FIELD OF THE DISCLOSURE

The disclosure relates to the field of computer programs and systems, and more specifically to methods, systems and programs for determining a 3D modeled object deformation.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behavior of a future product. CAM is an acronym for Computer-Aided Manufacturing, e.g. it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systèmes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

In this context and other contexts, deforming 3D modeled objects is gaining wide importance.

The following papers relate to this field and are referred to hereunder:

[1] W. Wang, D. Ceylan, R. Mech, and U. Neumann. 3dn: 3d deformation network. In Conference on Computer Vision and Pattern Regognition (CVPR), 2019.

[2] T. Groueix, M. Fisher, V. G. Kim, B. Russell, and M. Aubry. AtlasNet: A Papier-Mâché Approach to Learning 3D Surface Generation. In Conference on Computer Vision and Pattern Regognition (CVPR), 2018.

[3] Reconstructing a 3D Modeled Object. U.S. Pat. No. 9,978,177B2, granted in 2018. Éloi Mehr and Vincent Guitteny.

[4] D. Jack, J. K. Pontes, S. Sridharan, C. Fookes, S. Shirazi, F. Maire, and A. Eriksson. Learning free-form deformations for 3d object reconstruction. In Asian Conference on Computer Vision (ACCV), 2018.

[5] I. Kokkinos, and A. Yuille. Unsupervised Learning of Object Deformation Models. In International Conference on Computer Vision (ICCV), 2007.

[6] J. Mairal, F. Bach, and J. Ponce. Sparse Modeling for Image and Vision Processing. New Foundations and Trends, 2014.

[7] V. Blanz and T. Vetter. A morphable model for the synthesis of 3d faces. In SIGGRAPH, 1999.

[8] C. Qi, H. Su, K. Mo, and L. Guibas. Pointnet: Deep learning on point sets for 3d classification and segmentation. In Conference on Computer Vision and Pattern Regognition (CVPR), 2017.

[9] R. Hanocka, A. Hertz, N. Fish, R. Giryes, S. Fleishman, and D. Cohen-Or. Meshcnn: A network with an edge. In SIGGRAPH, 2019.

[10] Eloi Mehr, Ariane Jourdan, Nicolas Thome, Matthieu Cord, and Vincent Guitteny. DiscoNet: Shapes Learning on Disconnected Manifolds for 3D Editing. In ICCV 2019.

[11] J. Liu, F. Yu, and T. Funkhouser. Interactive 3D Modeling with a Generative Adversarial Network. In International Conference on 3D Vision (3DV), 2017.

[12] B. Lévy and H. Zhang. Spectral Mesh Processing. In SIGGRAPH Asia, 2009.

However, there is still a need for an improved solution for deforming 3D modeled objects.

SUMMARY

It is therefore provided a computer-implemented method for determining a 3D modeled object deformation. The method comprises providing a deformation basis function configured for inferring a deformation basis of an input 3D modeled object. The method further comprises providing a first 3D modeled object. The method further comprises providing a deformation constraint of the first 3D modeled object. The method further comprises determining a second 3D modeled object which respects the deformation constraint. The determining of the second 3D modeled object comprises computing a trajectory of transitional 3D modeled objects between the first 3D modeled object and the second 3D modeled object. The trajectory deforms each transitional 3D modeled object by a linear combination of the result of applying the deformation basis function to the transitional 3D modeled object. The trajectory reduces a loss. The loss penalizes an extent of non-respect of the deformation constraint by the deformed transitional 3D modeled object.

The method may comprise one or more of the following:

the trajectory corresponds to an integral formula of the type:

$$X(t) = X(0) + \int_0^t \sum_{i=1}^{B} \alpha_i(u) V_i(X(u))du, \{\alpha_i : \mathbb{R} \to \mathbb{R}\}_{i=1, \ldots, B},$$

where:

$X(0)$ is the first 3D modeled object, $X(.)$ corresponds to a transitional 3D modeled object, $V_1(X(.)), \ldots, V_B(X(.))$ corresponds to the result of applying the deformation basis function to the transitional 3D modeled object, $V_1(.), \ldots, V_B(.)$ being the deformation basis function, and $$\sum_{i=1}^{B} \alpha_i(.) V_i(X(.))$$

corresponds to the linear combination, $\alpha_1(.), \ldots, \alpha_B(.)$ being coefficients of the linear combination;

the computing comprises discretizing the trajectory by computing a sequence of intermediate 3D modeled objects converging toward the second 3D modeled object and reducing the loss;

the computing of the sequence comprises, starting from the first 3D modeled object, iterations of:

applying the deformation basis function to an intermediate 3D modeled object computed at the previous iteration, the applying yielding vectors;

determining, among candidate deformations of the intermediate 3D modeled object computed at the previous iteration each by a respective linear combination of the yielded vectors, a candidate deformation minimizing the loss; and selecting, as the next intermediate modeled object, the determined candidate deformation applied to the current intermediate 3D modeled object;

the determining of the candidate deformation minimizing the loss explores candidate sets of coefficients of the respective linear combination and operates a selection among the explored candidate sets, the selected set of candidate coefficients being respective to the determined candidate deformation;

the determining of the candidate deformation minimizing the loss is carried out under the constraint that a norm of each candidate set of coefficients is smaller than a predefined value;

the norm is a L1 norm or a L2 norm; and/or the providing of the deformation constraint of the first 3D modeled object comprises, by a user, defining the deformation constraint.

It is further provided a computer program comprising instructions which, when the computer program is carried out on a computer, cause the computer to carry out the method.

It is further provided a computer readable data storage medium having recorded thereon the computer program.

It is further provided a computer comprising a processor coupled to a memory, the memory having recorded thereon the computer program.

BRIEF DESCRIPTION OF THE DRAWINGS

Embodiments will now be described, by way of non-limiting example, and in reference to the accompanying drawings, where.

DETAILED DESCRIPTION

Figure 1:
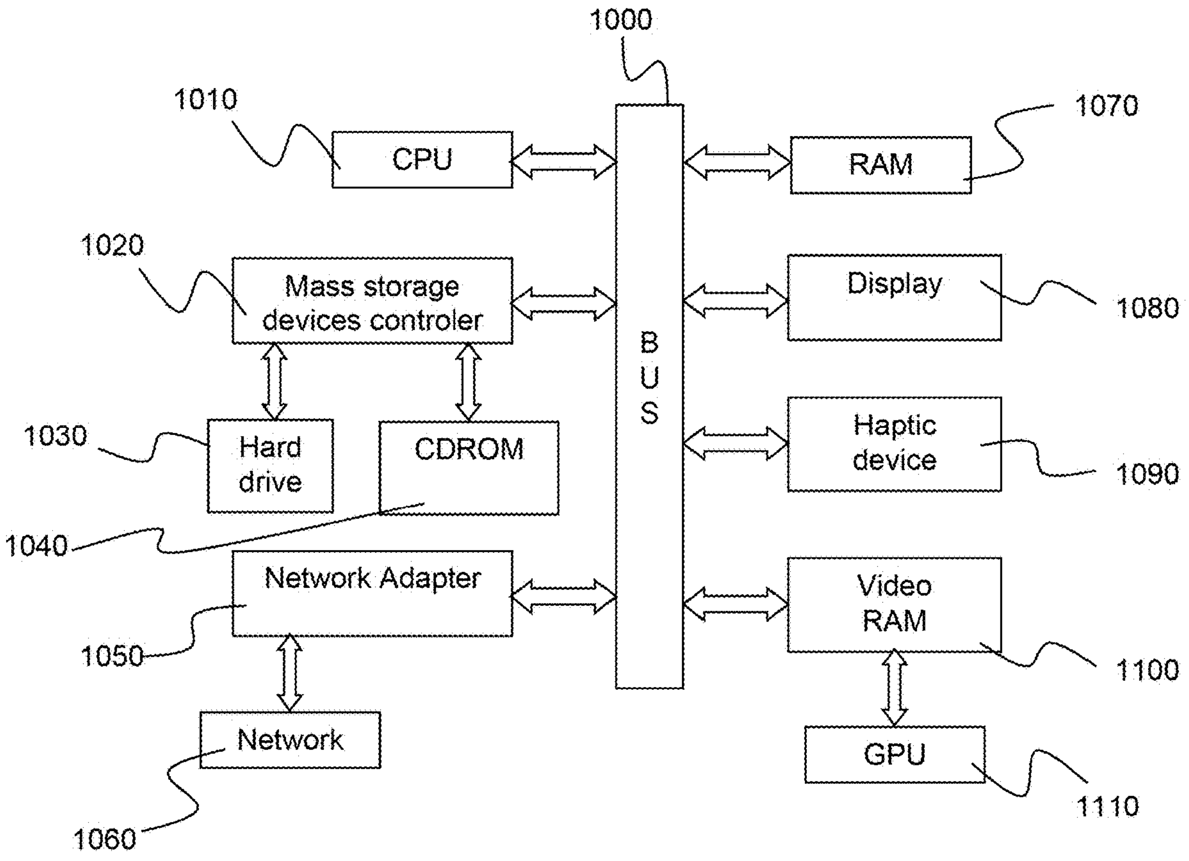
FIG. 1 shows an example of the computer.

It is provided a first computer-implemented method of machine-learning, for inferring a deformation basis of a 3D modeled object. The method comprises providing a dataset of 3D modeled objects. The method further comprises learning a neural network. The neural network is configured for inferring a deformation basis of an input 3D modeled object. The first method may be referred to as "the learning method".

This constitutes an improved solution for deforming 3D modeled objects.

Notably, the neural network learnt by the learning method is configured for taking as input a 3D modeled object and outputting a deformation basis of the 3D modeled object. The deformation basis comprises vectors each forming a deformation of the input 3D modeled object. This allows obtaining of many deformations of the 3D modeled object, as the vectors of the basis may be linearly combined, each possible linear combination yielding a different deformation of the 3D modeled object. The learning method thus allows increasing of the possibilities of deformation of the 3D modeled object. Furthermore, the learning method is allowed to do so by computing the deformation basis once and for all, by a single application of the learnt neural network, such that only linear combinations need be performed after that. This allows computing of deformations efficiently, notably in terms of computing time and resource use. It is also to be noted that the neural network does not require a target deformation of the 3D modeled object in order to yield the deformation basis: the neural network alone yields a basis of deformation vectors which then may be linearly combined to reach a target deformation of the input 3D modeled object. The learning method thus has a great generalization power and maximizes expressiveness of an input 3D modeled object.

The neural network may infer a local deformation basis which may comprise local deformation vectors, i.e. each vector representing a local (e.g. small) deformation of the input 3D modeled object. This allows deformation of the 3D modeled object realistically in a local neighborhood thereof (i.e. in a vicinity of the 3D modeled object). Said otherwise, the neural networks outputs a satisfactory basis in the sense that the basis allows to deform in a physically acceptable manner input objects towards close objects.

Furthermore, the neural network is learnt on the 3D modeled objects of the dataset, which are, at least in majority (e.g. in totality), plausible 3D modeled objects. Thereby, the neural network yields a basis of plausible vectors of deformation of the input 3D modeled object. As previously discussed, these vectors may be linearly combined, thereby yielding plausible deformations of the input 3D modeled object, for example in a local neighborhood thereof.

Moreover, the provided dataset need not be made of objects of a same category (e.g. all chairs) for the neural network to be learnt to infer a basis of plausible deformation vectors of an input 3D modeled object. Specifically, if the provided dataset is made of or substantially made of a large amount of 3D modeled objects of a same category (e.g. all chairs), the neural network will admittedly infer physically realistic deformation basis of an object of this category (e.g. a chair). However, the neural network may do so even if the 3D modeled objects of the provided dataset forms different categories (e.g. chairs and benches) and even if these categories are not represented by a large amount of 3D modeled objects within the provided dataset. Notably, the learning does not require the objects of the provided dataset to be annotated with labels indicative of their respective categories (if any). Also, the learning does not require the use of template modeled objects such as mean shapes of object's categories. In addition, the provided dataset need not be clustered according to object's categories. This further improves the generalization power of the neural network.

Nevertheless, the generalization power of the neural network is further improved when the provided dataset comprises two or more categories of 3D modeled objects forming a manifold (e.g. chairs and benches). Indeed, the manifold may be formed by different categories of objects having at least two-by-two a connectivity between them, that is, a certain amount of shared features/characteristics (e.g. as do chairs and benches). Because of this, a single vector of the deformation basis may be a meaningful plausible deformation for many object categories within the manifold (e.g. the seat of chairs and benches may be deformed similarly). Said otherwise, if the provided dataset forms a manifold of 3D modeled object (e.g. chairs and benches), the neural network is learnt in such a manner that it mutualizes between the deformations of different categories of objects. This allows the neural network to learn to infer physically realistic/acceptable deformation basis even if the provided dataset is made of few modeled objects of the different categories forming the manifold. This improves the generalization power of the neural network.

Generally speaking, the generalization power that the learning imparts to the neural network is such that the learning requires a training dataset (i.e. the provided dataset) comprising, as compared to other deep learning frameworks, less 3D modeled objects per category without impacting the ability of the neural network to infer deformations basis. Specifically, fewer objects per categories are required as the neural network is able to mutualize between the deformations learnt on different categories. However, if the provided dataset comprises only one category of objects of two very different categories, a larger amount of objects may be required.

The deformations obtained by using the deformation basis outputted by the neural network may be used in 3D modeling, for example for 3D editing applications. The basis inferred by the neural network may also be used in other applications, such as shape matching and non-linear deformations inference, as further discussed hereinafter. Furthermore, the neural network provides linear deformations of an input 3D modeled object, which are efficient for use in real-time applications.

It is also provided a second computer-implemented method for determining a 3D modeled object deformation. The method comprises providing a deformation basis function configured for inferring a deformation basis of an input 3D modeled object. The method further comprises providing a first 3D modeled object. The method further comprises providing a deformation constraint of the first 3D modeled object. The method further comprises determining a second 3D modeled object which respects the deformation constraint. The determining of the second 3D modeled object comprises computing a trajectory of transitional 3D modeled objects between the first 3D modeled object and the second 3D modeled object. The trajectory deforms each transitional 3D modeled object by a linear combination of the result of applying the deformation basis function to the transitional 3D modeled object. The trajectory reduces a loss. The loss penalizes an extent of non-respect of the deformation constraint by the deformed transitional 3D modeled object. The second method may be referred to as “the determining method”.

The determining method constitutes an improved solution for deforming 3D modeled objects.

Notably, the determining method determines a second 3D modeled object from the first 3D modeled object, by computing a trajectory of transitional 3D modeled objects between these two objects, each transitional 3D modeled object being the result of a deformation of another transitional 3D modeled object. In other words, the determining method deforms the first 3D modeled object along a trajectory of deformed transitional 3D modeled objects that eventually reaches the second 3D modeled object. Thereby, the determining method determines a large and non-linear deformation of the first 3D modeled object.

Furthermore, the determining method deforms each transitional 3D modeled object by a linear combination of the result of applying the deformation basis function to the transitional 3D modeled object. The applying of the deformation basis function yields a deformation basis of the transitional 3D modeled object, i.e. a basis of deformation vectors of the transitional 3D modeled object. The basis is a set of vectors each being a direction of deformation of the transitional 3D modeled object. The basis is, or at least tends to be, a basis in the linear algebra meaning. The vectors of the basis are such that they may be linearly combined to deform the transitional 3D modeled object into another transitional 3D modeled object, which is a plausible local deformation of the transitional 3D modeled object. For example, the deformation basis function may be a neural network learnable by the learning method, e.g. having been learnt by the learning method, such a deformation basis function yielding such vectors as previously discussed. Thereby, the determining method linearly and locally deforms each transitional 3D modeled object into a neighboring plausible transitional 3D modeled object until reaching the second 3D modeled object. Said otherwise, based only on a deformation basis function that provides a basis of realistic local deformation directions of an input 3D modeled object, the determining method computes a trajectory from the first 3D modeled object to the second 3D modeled object. Said in yet other words, the determining method achieves a large deformation of the first 3D modeled object based only on a deformation basis function that yields local plausible deformations, which makes the determining method efficient. Furthermore, as the local deformations used along the trajectory are plausible and realistic, i.e. they realistically deform a 3D modeled object into another one belonging in the vicinity of the 3D modeled object, the large deformation for reaching the second 3D modeled object from the first is realistic as well.

The efficiency and the realism of the determining method are notably improved when the deformation basis function is configured to infer a deformation basis of an input 3D modeled object belonging to a manifold of 3D modeled object. This is for example the case when the deformation basis function is a neural network learnable (e.g. having been learnt) according to the learning method, on a dataset of 3D modeled objects forming a manifold, as previously discussed. Indeed, as previously discussed, the neural network learnt in such a way has an improved generalization power. In such a case, any 3D modeled object involved in the determining method may as well belong to this manifold. Physically realistic local deformations of the transitional 3D modeled objects are in such a case efficiently inferred by the neural network, as previously discussed for the learning method. Ultimately, the large deformation of the first 3D modeled object that is the second 3D modeled object is as well efficiently and realistically determined.

Moreover, the trajectory reduces a loss penalizing an extent of non-respect of the deformation constraint by the deformed transitional 3D modeled object. In other words, the loss is such that, the more a 3D modeled object respects the deformation constraint, the smaller the loss is. The trajectory of transitional 3D modeled objects is such that the loss decreases/reduces along it. In other words, the transitional 3D modeled objects respect better and better the deformation constraint along the trajectory up to the second 3D modeled object. Therefore, the second 3D modeled object respects best, among the transitional 3D modeled objects, the deformation constraint. In other words, the second 3D modeled object tends to be a minimum of the loss, or at least tends to be close to the minimum of the loss. The determining method thereby yields an optimal large non-linear plausible deformation of the first 3D modeled object.

In other words, the determining method, by relying only on a local plausible deformation basis inferring function, yields a 3D modeled object (i.e. the second) which is a large plausible deformation of the first 3D modeled object and which respects the deformation constraint. This makes the determining method efficient and robust. This also means that the determining method allows for large realistic deformations of a 3D modeled object to be determined. As such, the determining method may efficiently be used for 3D modeling or 3D editing, as a user needs only to define a deformation constraint on the first 3D modeled object for the determining method to provide him/her with a large plausible deformation of this object that meets the user intent. Thereby, the determining method also constitutes an improved and ergonomic solution for 3D editing.

The learning method and the determining method may be performed independently. Alternatively, the determining method may be an application of the learning method that is a method of use of the neural network learnt by the learning method. The deformation basis function of the determining method may indeed be the neural network. Alternatively or additionally, the determining method's deformation basis function may be any neural network learnable according to the learning method, for example a neural network directly learnt according to the learning method. For example, the providing of the deformation basis function may comprise performing the learning method, which yields a neural network forming the deformation basis function.

The methods may be integrated into a same computer-implemented process of 3D modeled object deformation. The process may comprise an offline stage and an online stage following the offline stage, the learning method forming the offline stage, the determining method forming the online stage. The offline stage thus comprises the providing of a dataset and the learning of a neural network according to the learning method, while the online stage comprises the providing and the determining of the second 3D modeled object according to the determining method.

The learning method, the determining method, and the process are computer-implemented methods.

This means that steps (or substantially all the steps) of the methods are executed by at least one computer, or any system alike. Thus, steps of the methods are performed by the computer, possibly fully automatically, or, semi-automatically. In examples, the triggering of at least some of the steps of the methods may be performed through user-computer interaction. The level of user-computer interaction required may depend on the level of automatism foreseen and put in balance with the need to implement user's wishes. In examples, this level may be user-defined and/or pre-defined.

A typical example of computer-implementation of a method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database).

The methods herein generally manipulate modeled objects. A modeled object is any object defined by data stored e.g. in the database. By extension, the expression "modeled object" designates the data itself. According to the type of the system, the modeled objects may be defined by different kinds of data. The system may indeed be any combination of a CAD system, a CAE system, a CAM system, a PDM system and/or a PLM system. In those different systems, modeled objects are defined by corresponding data. One may accordingly speak of CAD object, PLM object, PDM object, CAE object, CAM object, CAD data, PLM data, PDM data, CAM data, CAE data. However, these systems are not exclusive one of the other, as a modeled object may be defined by data corresponding to any combination of these systems. A system may thus well be both a CAD and PLM system.

By CAD system, it is additionally meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD, a modeled object may typically be a 3D modeled object, e.g. representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process.

Any 3D modeled object herein (i.e. in any of the methods) may represent the geometry of a product to be manufactured in the real world subsequent to the completion of its virtual design with for instance a CAD software solution or CAD system, such as a (e.g. mechanical) part or assembly of parts (or equivalently an assembly of parts, as the assembly of parts may be seen as a part itself from the point of view of the methods, or the methods may be applied independently to each part of the assembly), or more generally any rigid body assembly (e.g. a mobile mechanism). A CAD software solution allows the design of products in various and unlimited industrial fields, including: aerospace, architecture, construction, consumer goods, high-tech devices, industrial equipment, transportation, marine, and/or offshore oil/gas production or transportation. Any 3D modeled object involved in the methods may thus represent an industrial product which may be any mechanical part, such as a part of a terrestrial vehicle (including e.g. car and light truck equipment, racing cars, motorcycles, truck and motor equipment, trucks and buses, trains), a part of an aerial vehicle (including e.g. airframe equipment, aerospace equipment, propulsion equipment, defense products, airline equipment, space equipment), a part of a naval vehicle (including e.g. navy equipment, commercial ships, offshore equipment, yachts and workboats, marine equipment), a general mechanical part (including e.g. industrial manufacturing machinery, heavy mobile machinery or equipment, installed equipment, industrial equipment product, fabricated metal product, tire manufacturing product), an electro-mechanical or electronic part (including e.g. consumer electronics, security and/or control and/or instrumentation products, computing and communication equipment, semiconductors, medical devices and equipment), a consumer good (including e.g. furniture, home and garden products, leisure goods, fashion products, hard goods retailers' products, soft goods retailers' products), a packaging (including e.g. food and beverage and tobacco, beauty and personal care, household product packaging).

FIG. 1 shows an example of the system, wherein the system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 may also be a frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the methods. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the methods by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the methods.

The learning method is now further discussed.

The providing of the dataset of 3D modeled objects is now discussed. Prior to this discussion, data structures involved therein are now discussed.

Any 3D modeled object herein may form a discrete geometrical representation of a 3D shape, e.g. representing an object from the real world such as a mechanical part as previously discussed. The discrete geometrical representation is herein a data structure which comprises a discrete set of pieces of data. Each piece of data represents a respective geometrical entity positioned in a 3D space. Each geometrical entity represents a respective location of the 3D shape (in other words, a respective portion of material constitutive of a solid represented by the 3D shape). The aggregation (i.e. union or juxtaposition) of the geometrical entities represents altogether the 3D shape. Any discrete geometrical representation herein may in examples comprise a number of such pieces of data higher than 100, 1000, or 10000.

Any discrete geometrical representation herein may for example be a 3D point cloud, each geometrical entity being a point. Any discrete geometrical representation herein may alternatively be a 3D mesh, each geometrical entity being a mesh tile or face. Any 3D mesh herein may be regular or irregular (i.e. consisting or not of faces of a same type). Any 3D mesh herein may be a polygonal mesh, for example a triangular mesh. Any 3D mesh herein may alternatively be a B-Rep. Any 3D mesh herein may be obtained from a 3D point cloud, for example by triangulating the 3D point cloud (e.g. with a Delaunay triangulation). Any 3D point cloud herein may be determined from physical measurements on a real object, for example within a 3D reconstruction process. The 3D reconstruction process may comprise providing the real object, providing one or more physical sensors each configured for acquiring a respective physical signal, and acquiring one or more respective physical signals by operating the one or more physical sensors on the real object (i.e. scanning the real object with each sensor). The 3D reconstruction may then automatically determine a 3D point cloud and/or a 3D mesh based on the measurements, according to any technique. The one or more sensors may comprise a plurality of (e.g. RGB, and/or image or video) cameras and the determination may comprise a structure-from-motion analysis. The one or more sensors may alternatively or additionally comprise one or more depth sensors (e.g. on an RGB-depth camera) and the determination may comprise a 3D reconstruction from depth data. The one or more depth sensors may for example comprise a laser (e.g. a lidar) or an ultrasound emitter-receiver.

Any 3D point cloud or 3D mesh herein may alternatively be obtained from a 3D modeled object representing a skin (i.e. outer surface) of a solid (e.g. corresponding to B-Rep model, which represents a skin, i.e. an exact surface), for example by ray-casting on the 3D modeled object or tessellating the 3D modeled object. The tessellating may be performed according to any 3D modeled object rendering process. Such a rendering process may be coded on any CAD system in order to display a graphical representation of the 3D modeled object. The 3D modeled object may be designed or have been designed by a user with a CAD system.

The providing of the dataset may comprise forming the dataset, e.g. by creating the 3D modeled objects. Alternatively, the providing of the dataset may comprise retrieving the dataset from a (e.g. distant) memory where it has been stored subsequent to its creation. The 3D modeled objects of the dataset may all be 3D point clouds, e.g. resulting from a pre-processing of 3D meshes. Alternatively, they may all be 3D meshes. In such a case, the learning method may comprise a pre-processing of these meshes which samples them into 3D point clouds. The pre-processing may then comprise centering each 3D mesh. The pre-processing may then comprise rescaling independently each 3D mesh's dimensions such that the mesh vertices exactly fits in a unit cube. The pre-processing may then comprise extracting a dense point cloud from each normalized shape in the dataset, e.g. by raycasting each one on 6 orthographic views. The pre-processing may then comprise uniformly sub-sampling each point cloud (e.g. by downsampling each point cloud to the same size). The sub-sampling may start by a random point of the point cloud and iteratively pick the furthest point of the point cloud from the already selected points, reaching the desired number of points.

The 3D modeled objects of the dataset may be plausible (e.g. realistic) 3D modeled object. A plausible 3D modeled object may designate a 3D modeled object representing a real world object, such as a plausible mechanical part. A plausible mechanical part may designate a mechanical part realistically manufacturable in a real-world industrial manufacturing process. A plausible mechanical part may refer to a mechanical part which respects all the constraints that must be respected in order to realistically manufacture the mechanical part in a real-world industrial manufacturing process. The constraints may comprise one or more of the following: mechanical constraints (e.g. constraints resulting from the laws of classic mechanics), functional constraints (e.g. constraints relative to one or more mechanical functions to be performed by the mechanical part once manufactured), manufacturing constraints (e.g. constraints pertaining to the ability of applying one or more manufacturing tools to the mechanical part during one or more manufacturing processes for manufacturing the mechanical part), structural constraints (e.g. constraints pertaining to the strength and/or resistance of the mechanical part) and/or assembly constraints (e.g. constraints defining how the mechanical part can be assembled with one or more other mechanical parts).

As previously discussed, the 3D modeled objects of the provided dataset may all or substantially all belong to a single category of 3D modeled objects. Alternatively, they may form different categories of 3D modeled objects, e.g. said categories forming a manifold. In any case, the 3D modeled objects of the dataset represent each a respective object from the real world, such as mechanical part as previously discussed.

The learning of the neural network is now discussed.

In the field of machine-learning, the processing of an input by a neural network includes applying operations to the input, the operations being defined by data including weight values. Learning a neural network thus includes determining values of the weights based on a dataset configured for such learning, such a dataset being possibly referred to as a learning dataset or a training dataset. For that, the dataset includes data pieces each forming a respective training sample.

The training samples represent the diversity of the situations where the neural network is to be used after being learnt. Any dataset referred herein may comprise a number of training samples higher than 1000, 10000, 100000, or 1000000. Herein, the neural network is learnt on the provided dataset, which means that the provided dataset is a learning/training dataset of the neural network. The learning may be carried out by any suitable method.

The neural network is configured for inferring a deformation basis of an input 3D modeled object. In other words, the neural network takes as input a 3D modeled object and outputs a deformation basis of the 3D modeled object. For that, the input 3D modeled object is of the same data type than the 3D modeled objects of the dataset. For example, if the 3D modeled objects of the dataset are 3D meshes, the input 3D modeled object is also a 3D mesh. Alternatively, if the 3D modeled objects of the dataset are 3D point clouds, the input 3D modeled object is also a 3D point cloud. The 3D modeled object may nonetheless be a 3D point cloud that results from a sampling of a mesh. The deformation basis is a set of vectors each being a direction of deformation. The vectors may be linearly combined to deform the input 3D modeled object, the linear combination with its coefficients (also referred to as amplitudes) set yielding the deformation. The vectors may be linearly combined in such a way that if the linear combination is small enough, the deformed input 3D modeled object is close to the input 3D modeled object. In such a case the deformation thereof is realistic. Mathematically, the deformation is realist as long as the manifold thereof stays sufficiently close to the deformation, which is on the tangent space, the latter being defined by the deformation basis. The deformation basis may be a basis in the meaning of linear algebra, that is a set of linearly independent vectors, the basis being possibly normalized, e.g. orthonormal. Specifically, the learning aims for the neural network to infer, or at least to tend to infer, a basis of deformation vectors which are linearly independent (e.g. uncorrelated and/or orthonormal, as further discussed hereinafter). The deformation basis may have a fixed size (e.g. between 2 and 10 vectors, or more than 10 vectors). In other words, the neural network may always (i.e. for each input 3D modeled object) output a deformation basis having a same fixed number of vectors. Where the dataset is made of plausible 3D modeled objects, the neural network infers a basis of plausible deformation vectors of the 3D modeled objects, because it is learnt to do so.

The neural network has an architecture configured for taking as input a 3D modeled object and to output its deformation basis. The neural network may comprise an encoder and a deep feedforward neural network. The encoder is configured to take as input a 3D modeled object and to output a latent vector representing the input 3D modeled object. The encoder may thus be configured to take as input a 3D mesh or a 3D point cloud, e.g. sampled from a 3D mesh. The deep feedforward neural network is configured to take as input a latent vector outputted by the encoder and to output a deformation basis of a 3D modeled object represented by the latent vector. The encoder architecture may be based on PointNet (such as described for example in previously-cited reference [8], which is incorporated herein by reference) or any extension thereof. Alternatively, the encoder architecture may use mesh topology (i.e. if the 3D modeled objects of the dataset are 3D meshes), for example as done in MeshCNN (see for example previously cited reference [9], which is incorporated herein by reference).

The learning may comprise, for at least a part of the dataset, minimizing a loss. For each 3D modeled object of the at least a part of the dataset and for each candidate deformation basis having vectors, the loss penalizes a distance between a deformation of the 3D modeled object by a linear combination of the vectors and another 3D modeled object.

The minimizing of the loss is now discussed.

The at least a part of the dataset is a sample of 3D modeled objects of the dataset. For example, the at least a part of the dataset may be a mini-batch, the learning being in such a case carried out mini-batch by mini-batch and comprising, for each mini-batch, minimizing the loss. The concept of learning mini-batch by mini-batch is performed in the field of machine-learning. For example, the learning may implement any mini-batch stochastic optimization method, such as a mini-batch stochastic gradient descent. Learning mini-batch by mini-batch improves efficiency of the learning, is performed in the field of machine-learning.

For each 3D modeled object of the at least a part of the dataset, the learning assesses a deformation basis of the modeled object outputted by the neural network with its current weight values. This computed deformation basis forms a candidate deformation basis of the 3D modeled object. The loss penalizes a distance between a deformation of the 3D modeled object by a linear combination of the vectors of this candidate basis and another 3D modeled object. This means that the loss tends to increase when the distance between the deformation of the 3D modeled object by the linear combination of the vectors of this candidate basis and said another 3D modeled object is large. If this is the case, the learning, which minimizes the loss, modifies the weights of the neural network to lower the value of the loss, thus yielding new candidates. The learning does so (e.g. mini-batch by mini-match) until the loss reaches its minimum, or at least a sufficiently small value (e.g. with respect to a convergence criterion).

Said another 3D modeled object may be a target object, i.e. in which the linear combination of the vectors is to deform the 3D modeled object. This allows to train the neural network to infer a basis of deformations. For example, said another 3D modeled object may be, among 3D modeled objects of the at least a part of the dataset, a close 3D modeled object to the 3D modeled object of the at least a part of the dataset. In other words, the learning may notably comprise selecting said another 3D modeled object among 3D modeled objects of the at least a part of the dataset, based on a distance from the 3D modeled object of the at least a part of the dataset. The selecting may comprise computing the distances between each 3D modeled object of the at least a part of the dataset and said 3D modeled object of the at least a part of the dataset, and assessing which 3D modeled objects are close, that is for which 3D modeled objects the distance is small. Then the selecting may select a 3D modeled object for which the distance is small. In examples, the selecting may assess which 3D modeled object is the closest, that is for which 3D modeled object the distance is the smallest. In other words, the selecting computes a minimum of the distances and assesses which 3D modeled object yields this minimum. In these examples, said another 3D modeled object is, among 3D modeled objects of the at least a part of the dataset, a closest 3D modeled object to the 3D modeled object of the at least a part of the dataset. In examples, the learning may be carried out mini-batch by mini-batch and comprises, for each mini-batch, minimizing the loss and selecting said closest 3D modeled object among 3D modeled objects of the mini-batch. Said otherwise, the selecting of the another 3D modeled object is among objects of a mini-batch, the at least a part of the dataset being a mini-batch.

Said distance from the 3D modeled object of the at least a part of the dataset may be any distance, such as a distance between 3D modeled objects, e.g. a distance in 3D between point clouds or 3D meshes. In examples, the distance may be a distance in a latent space, as now discussed.

Specifically, in these examples, the learning method may comprise providing, e.g. before the learning, such as at an initial stage of the learning method, another encoder which is configured to take as input a 3D modeled object of the provided dataset and to output a latent vector encoding this 3D modeled object. Said another encoder may be trained in an autoencoder framework, or in a classification task, or by any other machine-learning method, in order to learn a meaningful latent space of 3D modeled objects as is performed in the field of machine-learning. The providing of said another encoder may comprise training said another encoder. Alternatively, said another encoder may be pre-trained. In these examples, the distance, say between a first 3D modeled object and a second 3D modeled object, may be a distance in the latent space of said another encoder between the result of applying said another encoder to the first 3D modeled object and the result of applying said another encoder to the second 3D modeled object. This latent space distance allows to train the neural network to infer a basis of deformations with more accuracy, as the latent vectors outputted by said another encoder capture the semantics of the encoded 3D modeled objects. Said otherwise, said encoder implicitly clusters the dataset with respect to semantics. This allows to determine said another 3D modeled object as the most similar 3D modeled object to said 3D modeled object of the at least a part of the dataset. The use of this latent space distance thus improves accuracy of the learning, as well as efficiency, e.g. as compared to a distance in 3D modeled object space which can cost more to compute.

The selecting of said another 3D modeled object may be carried out before the minimizing. For example, the results of applying said another encoder to the 3D modeled objects of the dataset may be pre-computed, i.e. computed before the minimizing.

The linear combination has coefficients, each corresponding to the contribution of a respective vector in the combination. The coefficients may be computed by a neural network during the learning. Alternatively, they may be the result of an optimization which is performed during the learning.

The loss may penalize a minimum of the distance between the deformation of the 3D modeled object by the linear combination of the vectors and said another 3D modeled object. This selects the best deformation by a linear combination, that is the one which minimizes the distance, when minimizing the loss. The minimum may be for example be the minimum of the distance between the deformation of the 3D modeled object by a linear combination of the vectors and said another 3D modeled object among all possible values of the coefficients of the linear combination. The loss penalizes the minimum in that the loss tends to increase when the minimum is large. If this is the case, the learning, which minimizes the loss, modifies the weights of the neural network to lower the value of the loss. The learning does so (e.g. mini-batch by mini-batch) until the loss reaches its minimum, or at least a sufficiently small value (e.g. with respect to a convergence criterion).

The loss may be of the type:

$$E(w)=\sum_{i=1}^{N}\min_{\alpha_1,\ldots,\alpha_p} d_{CH}\left(p_i+\sum_{j=1}^{n}\alpha_j g_w(f_w(e_i),p_i)_j,\ q_i\right),$$

where:

- $e_1, \ldots, e_N$ are the 3D modeled objects of the at least a part of the dataset, N being the number of objects in the at least a part of the dataset,
- $p_1, \ldots, p_N$ are points clouds respectively obtained from $e_1, \ldots, e_N$,
- for each 3D modeled object $e_i$, $g_w(f_w(e_i),p_i)_1, \ldots, g_w(f_w(e_i),p_i)_n$ are the vectors of a candidate deformation basis of the 3D modeled object, n being the size of the candidate deformation basis, $$p_i+\sum_{j=1}^{n}\alpha_j g_w(f_w(e_i),p_i)_j$$

is the deformation of the 3D modeled object $e_i$ by the linear combination of the vectors, $\alpha_1, \ldots, \alpha_n$ being coefficients of the linear combination,
- $q_i$ is a point cloud obtained from said another 3D modeled object,
- $d_{CH}$ is the distance,
- the neural network having weights, w represents the weights of the neural network,
- $f_w$ is an encoder configured to take as input a 3D modeled object and to output a latent vector representing the input 3D modeled object, and
- $g_w$ is a deep feedforward neural network configured to take as input a latent vector outputted by the encoder and to output a deformation basis of a 3D modeled object represented by the latent vector.

$e_1, \ldots, e_N$ may already be 3D point clouds, in which case $e_1=p_1, \ldots, e_N=p_N$. Alternatively, $e_1, \ldots, e_N$ may be 3D meshes, in which case $p_1, \ldots, p_N$ may result from a sampling of $e_1, \ldots, e_N$. $d_{CH}$ may be any 3D distance between 3D point clouds, such as the Earth Mover distance or the Chamfer distance. $d_{CH}$ may in example be of the type:

$$d_{CH}(p,q)=\sum_{y\in p}\min_{z\in q}\|y-z\|_2^2+\sum_{z\in q}\min_{y\in p}\|y-z\|_2^2$$

$q_i$ may be computed as follows. Let f' be the previously discussed another encoder. Then for each i, the learning method determines $$i'=\underset{j\in[\![1,\ldots,N]\!]\setminus\{i\}}{\operatorname{argmin}}\|f'(e_i)-f'(e_j)\|_2.$$

Then $q_i$ is given by $q_i=p_{i'}$. As previously discussed, the vectors $f'(e_i)$ can be pre-computed.

The loss may further penalize, for each 3D modeled object and each candidate deformation basis, (e.g. a minimum of) a sparsity-inducing function that takes as input coefficients of the linear combination. The sparsity function may for example be the L1-norm of the coefficients of the linear combination (see for example reference [6], which is incorporated herein by reference), as previously discussed. In other words, the loss tends to increase when (e.g. the minimum of) the sparsity-inducing function is large. If this is the case, the learning, which minimizes the loss, modifies the weights of the neural network to lower the value of the loss. The learning does so (e.g. mini-batch by mini-batch) until the loss reaches its minimum, or at least a sufficiently small value (e.g. with respect to a convergence criterion). The loss may in this case be of the type:

$$E(w)=\sum_{i=1}^{N}\min_{\alpha_1,\ldots,\alpha_p} d_{CH}\left(p_i+\sum_{j=1}^{?t}\alpha_j g_w(f_w(e_i),p_i)_j,\ q_i\right)+\lambda\phi(\alpha_1,\ldots,\alpha_p),$$

$\lambda$ being a trade-off parameter (which is a concept applied in the field of machine-learning), $\phi$ being the sparsity-inducing function, such as the L1 norm (see for example previously cited reference [6], which is incorporated herein by reference), $(\alpha_1, \ldots, \alpha_p)$ being a vector of the coefficients, also referred to as a vector of amplitudes.

This allows to render the coefficients/amplitudes sparse during the learning. Ultimately, this allows the neural network to learn to output deformation basis vectors which are uncorrelated, which further increases the generalization power of the learning method. Notably, the neural network learnt in such a way outputs a satisfactory basis, as its sparsity allows to use few vectors to compute a deformation of the input 3D modeled object by a linear combination of the basis vectors. Also, the output basis is, or at least tends to be, a basis in the meaning of linear algebra.

The loss may further reward, for each 3D modeled object and each candidate deformation basis, orthonormality of the candidate deformation basis. In other words, the loss may further comprise a term capturing the orthonormality of the deformation basis of the 3D modeled object as inferred by the neural network with its current weight values, the term tending to be small when the deformation basis tends to be orthonormal. The loss may in this case be of the type:

$$E(w)=\sum_{i=1}^{N}\min_{\alpha_1,\ldots,\alpha_p} d_{CH}\left(p_i+\sum_{j=1}^{n}\alpha_j g_w(f_w(e_i),p_i)_j,\ q_i\right)+\lambda\phi(\alpha_1,\ldots,\alpha_p)+\delta\left\|g_w(f_w(e_i),p_i)g_w(f_w(e_i),p_i)^T-Id_{n\times n}\right\|_2,$$

$\delta$ being a trade-off parameter (which is a concept applied in the field of machine-learning). This further allows the neural network to learn to output deformation basis vectors which are uncorrelated, as they tend to be orthonormal. Thereby, such a basis is, or at least tends to be, a basis in the meaning of linear algebra.

The loss may further comprise any suitable regularization function, as is performed in the field of machine learning.

An implementation of the learning method is now discussed.

This implementation brings improvements to the fields of 3D Modeling and 3D Machine-Learning. The results of this implementation may be used in fields such as virtual and augmented reality (more generally, any kind of immersive experience), video games, manufacturing and 3D printing, or 3D modeling. This implementation provides a solution to compute a realistic sparse deformations linear basis for any 3D modeled object, which can then be exploited to perform shape synthesis, shape reconstruction from image, or shape matching.

This implementation allows to provide any 3D modeled object with a plausible linear deformations basis, such that the model can be realistically deformed in a local neighborhood by any linear combination of the deformations vectors that constitute its basis. Such a deformation can be used in 3D modeling software, especially for 3D editing applications. Namely, it can be used for the inference of large non-linear deformations and shape matching.

This implementation trains a neural network (the neural network learnt at the learning) that learns a linear 3D deformation field with sparse constraints, in order to get plausible deformations independent of each other. Starting from the provided dataset, which is a dataset of unlabeled 3D modeled object, this implementation learns (at the learning) a neural network that infers a deformation basis at each point of an input 3D modeled object model. To learn this network, the learning proceeds mini-batch by mini-batch, as previously discussed:

1) Matching each 3D modeled object of each batch with the closest 3D modeled object in the same batch. In other words, selecting, among 3D modeled objects of the batch, said another 3D modeled object closest to the 3D modeled object, as previously discussed.
2) Computing the linear combination of the predicted deformation vectors of the 3D modeled object that minimizes the distance between the deformation of the 3D modeled object by a linear combination of the deformation vectors as inferred by the neural network with its current weights and its closest 3D modeled object in the batch, with additional sparse regularization terms.
3) Minimizing the same loss (the distance between the deformed 3D modeled object and its closest 3D modeled object) over the weights of the neural network, to optimize the predicted deformations basis.

This implementation does not require to cluster the different kinds of 3D modeled objects to learn each cluster separately. On the contrary, it is suited to directly learn on the whole dataset all at once. This implementation learns an uncorrelated deformations basis, where each deformation is plausible in itself. The inferred deformations are linear, and thus can be used in real-time applications. The deformations are inferred as a 3D deformation field, which maximizes the expressiveness of an input 3D modeled object.

At the providing of the dataset, this implementation may perform a pre-processing as previously discussed, in case the provided dataset is made of 3D meshes. The pre-processing comprises centering each mesh and rescaling independently its dimensions such that the mesh vertices exactly fits in a unit cube. The pre-processing comprises then extracting a dense point cloud from each normalized shape in the dataset by raycasting each one on 6 orthographic views. The pre-processing then comprises uniformly sub-sampling each point cloud (for example, by downsampling each point cloud to the same size). To do so, the pre-processing may start by a random point of the point cloud, and iteratively pick the furthest point of the point cloud from the already selected points, until reaching the a predefined (e.g. desired) number of points.

The architecture of the neural network according to the currently-discussed implementation is now discussed.

In this implementation, the neural network infers (e.g. for any input 3D modeled object), a same fixed number of deformation basis vector. Let n be this fixed same size of the inferred deformations basis. This implementation comprises designing an encoder architecture $f_w$ that takes as input a 3D point cloud or a 3D mesh, and outputs a latent vector $h \in \mathbb{R}^p$, representing the input 3D point cloud or a 3D mesh. Such an encoder architecture can be based on PointNet (see for example previously cited reference [8], which is incorporated herein by reference) or its numerous extensions or can also use the mesh topology as done in MeshCNN (see for example previously cited reference [9], which is incorporated herein by reference) for example. Thus, $f_w$ can be designed to take as input a 3D mesh x or its sampled 3D point cloud y.

In addition to $f_w$, this implementation comprises designing a deep feedforward neural network $g_w$ that takes as input the latent vector h of a 3D point cloud or a 3D mesh, as well as a 3D point x, and outputs its deformation basis $g_w(h,x)=(u_1, \ldots, u_n) \in \mathbb{R}^{n\times 3}$, at the point x. To further simplify the notations, let $g_w(h,p)_j$, $j \in \{1, \ldots, n\}$, be the vector $$\begin{pmatrix} g_w(h, X_1)_j \\ \vdots \\ g_w(h, X_m)_j \end{pmatrix} \in \mathbb{R}^{m\times 3},$$

for any point cloud or mesh $X \in \mathbb{R}^{m\times 3}$ containing m points or vertices. Thus, $g_w(h,X) \in \mathbb{R}^{n\times(m\times 3)}$ is the basis computed at all points of X. Besides, this implementation can built $g_w$ such that $\|g_w(h,X)_j\|_2=1$ for all $j \in \{1, \ldots, n\}$. w are the trainable weights of the neural networks f and g.

This implementation may comprise providing another encoder architecture f' similar to $f_w$. As previously discussed f' is trained in an autoencoder framework, or in a classification task, or any other machine learning method, in order to learn a meaningful latent space of 3D objects. This implementation uses said another encoder to efficiently match a 3D modeled object (3D mesh or 3D point cloud) with its closest 3D modeled object in a batch during the training of $f_w$.

This implementation performs, at the learning of the neural network, an unsupervised learning. This is now discussed.

The learning learns both networks $f_w$ and $g_w$ by any mini-batch stochastic optimization (e.g. a mini-batch stochastic gradient descent), by minimizing a loss E(w) (also referred to as "an Energy") for a mini-batch of N point clouds $p_1, \ldots, p_N$. Let $e_1, \ldots, e_N$ be the corresponding 3D modeled objects in the input space of $f_w$, i.e. if these inputs are point clouds $e_i=p_i$, and if they are meshes then $e_i$ is the source mesh that was used to sample $p_i$.

For each i, let $$i' = \underset{j\in[\![1,\ldots,N]\!]\setminus\{i\}}{\operatorname{argmin}} \|f'(e_i) - f'(e_j)\|_2,$$

and $q_i=p_{i'}$. The vectors $f'(e_i)$ can be pre-computed, i.e. this implementation comprising the pre-computing of the vectors, for example before the learning.

Then, the loss is given by the formula:

$$E(w) = \sum_{i=1}^{N} \min_{\alpha_1,\ldots,\alpha_p} d_{CH}\left(p_i + \sum_{j=1}^{n} \alpha_j g_w(f_w(e_i), p_i)_j, q_i\right) + \lambda\phi(\alpha_1, \ldots, \alpha_p) + \gamma\sigma\left(e_i, e_i + \sum_{j=1}^{n} \alpha_j g_w(f_w(e_i), e_i)_j\right) + \delta\left\|g_w(f_w(e_i), p_i) g_w(f_w(e_i), p_i)^T - Id_{n\times n}\right\|_2,$$

$d_{CH}$ is here the Chamfer 3D distance, but it could be replaced by any other 3D loss such as the Earth Mover distance:

$$d_{CH}(p,q)=\sum_{y\in p}\min_{z\in q}\|y-z\|_2^2+\sum_{z\in q}\min_{y\in p}\|y-z\|_2^2.$$

$\phi$ is a sparsity-inducing function, such as the $L^1$ norm [6]. Let $(\alpha_1, \ldots, \alpha_p)$ be referred to as a vector of amplitudes. This implementation seeks to make the amplitudes sparse, in order to uncorrelate the deformations as much as possible, such that any deformation vector is plausible in itself. For the same reason, this implementation forces the deformations basis to be orthonormal with the $\delta$ penalization, preceding a term capturing orthonormality of the basis as previously discussed.

$\sigma(e_i, e_i+v)$ can be any regularization function, which may include a combination of, but is not limited to:

- a penalization on the difference of the lengths of the edges between $e_i$ and $e_i+v$ (if $e_i$ is a point cloud, this implementation may comprise creating edges on its points using a k-nearest neighbors graph), and
- a penalization on the difference between the Laplacian coordinates of $e_i$ and $e_i+v$, i.e. between $L(e_i)$ and $L(e_i+v)$ where L is the Laplace operator of $e_i$. $\lambda$, $\delta$ and $\gamma$ are trade-off parameters.

In order to minimize E(w), the learning comprises computing the min over the amplitudes $(\alpha_1, \ldots, \alpha_p)$ for each input of the batch, as well as compute the gradient of E(w).

For each input $$i,\ \min_{\alpha_1,\ldots,\alpha_p} d_{CH}\Big(p_i+\sum_{j=1}^{n}\alpha_j g_w(f_w(e_i),p_i)_j,\ q_i\Big)+\lambda\phi(\alpha_1,\ldots,\alpha_p)+\gamma\sigma\Big(e_i,\ e_i+\sum_{j=1}^{n}\alpha_j g_w(f_w(e_i),e_i)_j\Big)$$

can be computed using a standard gradient descent, or any continuous optimization algorithm.

However, the gradient $\nabla E(w)$ might seem untractable, as the amplitudes $(\hat{\alpha}_1, \ldots, \hat{\alpha}_p)$ that achieve the minimum $$\min_{\alpha_1,\ldots,\alpha_p}$$

depend on w.

Let $$\mathcal{L}(w,\alpha_1,\ldots,\alpha_p)=d_{CH}\left(p_i+\sum_{j=1}^{n}\alpha_j g_w(f_w(e_i),p_i)_j,\ q_i\right)+\lambda\phi(\alpha_1,\ldots,\alpha_p)+\gamma\sigma\left(e_i,\ e_i+\sum_{j=1}^{n}\alpha_j g_w(f_w(e_i),e_i)_j\right)+\delta\left\|g_w(f_w(e_i),p_i)g_w(f_w(e_i),p_i)^T-Id_{n\times n}\right\|_2$$

and $$L(w)=\min_{\alpha_1,\ldots,\alpha_p} d_{CH}\left(p_i+\sum_{j=1}^{n}\alpha_j g_w(f_w(e_i),p_i)_j,\ q_i\right)+$$

-continued $$\lambda\phi(\alpha_1,\ldots,\alpha_p)+\gamma\sigma\left(e_i,\ e_i+\sum_{j=1}^{n}\alpha_j g_w(f_w(e_i),e_i)_j\right)+\delta\left\|g_w(f_w(e_i),p_i)g_w(f_w(e_i),p_i)^T-Id_{2\times 2}\right\|_2=\min_{\alpha_1,\ldots,\alpha_p}\mathcal{L}(w,\alpha_1,\ldots,\alpha_p)=\mathcal{L}(w,\hat{\alpha}_1,\ldots,\hat{\alpha}_p),$$

where $$(\hat{\alpha}_1,\ldots,\hat{\alpha}_p)=\underset{\alpha_1,\ldots,\alpha_p}{\operatorname{argmin}}\ \mathcal{L}(w,\alpha_1,\ldots,\alpha_p).$$

The envelope theorem makes the gradient of $\mathcal{L}(w, \alpha_1, \ldots, \alpha_p)$ tractable (and so the gradient of E(w) too), as it is equal to the gradient of $\mathcal{L}(w, \alpha_1, \ldots, \alpha_p)$ where $\alpha_1, \ldots, \alpha_p$ is considered constant with respect to w, i.e. the computing of the gradient do not backpropagates through the computation of the amplitudes $\alpha_1, \ldots, \alpha_p$. Namely, $$\nabla L(w)=\nabla_w\mathcal{L}(w,\hat{\alpha}_1,\ldots,\hat{\alpha}_p).$$

This can be proven using the fact that $\nabla_{\alpha_1,\ldots,\alpha_p}\mathcal{L}(w, \hat{\alpha}_1, \ldots, \hat{\alpha}_p)=0$ by definition of $(\hat{\alpha}_1, \ldots, \hat{\alpha}_p)$.

Figure 2:
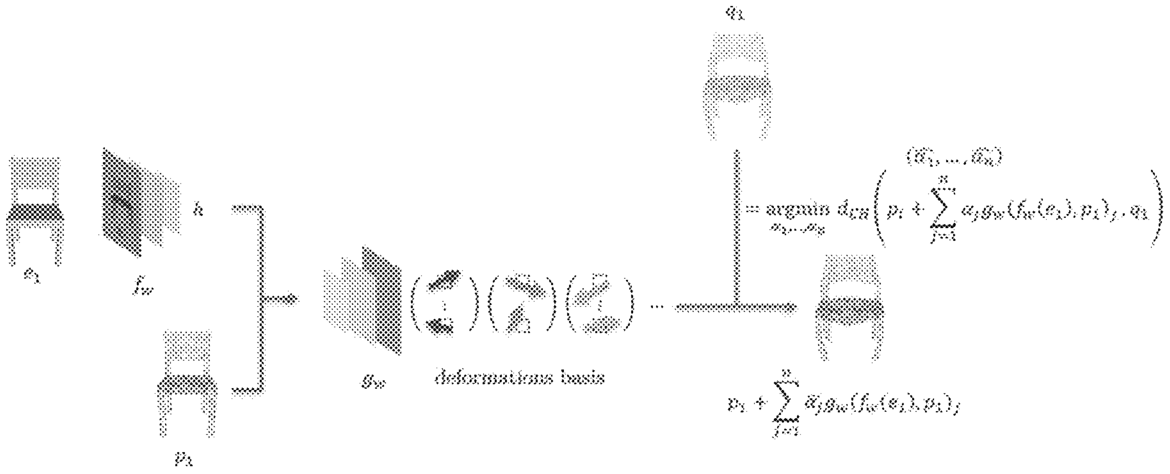
FIG. 2 illustrates a neural network that may be used by the method.

FIG. 2 illustrates the deep model architecture of the neural network learnt according to the currently-discussed implementation.

The determining method is now further discussed.

The determining method is for determining a 3D modeled object deformation. In other words, the determining method takes as input a 3D modeled object and outputs a deformation of the 3D modeled object, which is a large non-linear deformation. The determining method notably comprises providing (e.g. by user action, e.g. during a 3D edition process) a first 3D modeled object, which is the 3D modeled object to be deformed by the determining method. The first modeled object may be a 3D point cloud or a 3D mesh. For example, if the deformation basis function takes as input 3D point clouds, the first modeled object is a 3D point cloud. For example, if the deformation basis function takes as input 3D meshes, the first modeled object is a 3D mesh.

The determining method further comprises providing a deformation constraint of the first 3D modeled object. The concept of deformation constraint of a 3D modeled object is used. However, examples of concepts involved therein are now discussed, for completeness. Nevertheless, the determining method may implement any method for providing the deformation constraint.

The providing of the deformation constrain may be carried out by a user, i.e. may result from a user action. For example, the user may define the deformation constraint. The deformation constraint may designate a set of (e.g. geometric) specifications that determine a deformation of a geometrical shape of a part of the first 3D modeled object into another geometrical shape (which may be referred to as "the new geometrical shape" in the following). In other words, the deformation may not be directly defined by the user, but the user action may rather result in specifications forcing the deformation. In examples, it means that the user provides (e.g. declares, e.g. specifies), e.g. by using a keyboard and/or a touch and/or a haptic device, the set of specifications. Alternatively, the set of specifications may be (e.g. automatically) retrieved from a user action on (e.g. the part of) the first 3D modeled object. Alternatively, the set of specifications may be (e.g. automatically) retrieved from a drawing of the user on a screen comprising the first 3D modeled object. The deformation defined by the deformation constraint may thus define a deformation of the first 3D modeled object into a deformed version of the first 3D modeled object by deforming the geometrical shape of the part into the new geometrical shape.

The defining of the deformation constraint may result from a graphical-interaction of the user with the part of the first 3D modeled object. The graphical-interaction may comprise clicking on the first 3D modeled object, e.g. with a haptic device such as a mouse, or touching the first 3D modeled object with an appendage such as a finger. The graphical-interaction may further comprise moving the clicked on or touched 3D modeled object, for example by performing a drag and drop operation. For example, the user selects one or more points on the part of the 3D modeled object, e.g. by clicking on the one or more points with a haptic device such as a mouse and moves them by a drag and drop operation (e.g. moves them one by one by one or through a one-shot drag and drop operation). The respective one or more locations of the moved one or more points determine (e.g. form, e.g. result in) the new geometrical shape of the part of the first 3D modeled object. In other words, the first 3D modeled object has a given geometrical shape when provided, and the user may define the new geometrical shape by moving the points. The deformation of the given geometrical shape into the new geometrical shape is thus constrained by the respective one or more locations of the one or more points moved by the user. In other words, moving the one or more points defines the new geometrical shape of the part and the new geometrical shape of the part defines the deformation constraint.

Alternatively, the user may define the deformation constraint by drawing (e.g. by using a haptic device) a 3D or 2D drawing/sketch (e.g. on a display) which represents the new geometrical shape for the part of the first 3D modeled object, which has a given geometrical shape when provided. The deformation of the given geometrical shape into the new geometrical shape is thus constrained by the drawing of the user, e.g. which is captured by a set of pixels. In other words, the drawing of the user defines the new geometrical shape of the part and the new geometrical shape of the part defines the deformation constraint.

The determining method further comprises providing a deformation basis function, which is configured for inferring a deformation basis of an input 3D modeled object. In other words, the deformation basis function takes as input an input 3D modeled object and outputs the basis. The basis is, or at least tends to be, a basis in the meaning of linear algebra. The basis is a set of vectors, each vector being a direction of local plausible deformation of the input 3D modeled object. The vectors of the basis may be linearly combined, the resulting linear combination forming a local plausible deformation of the input 3D modeled object. The vectors of the basis are, or at least tend to be, uncorrelated. For example, the basis may be orthogonal, e.g. orthonormal.

For that, the deformation basis function may comprise (e.g. be) a neural network obtainable according to the learning method, e.g. a neural network learnt according to the learning method. In such a case, the basis comprises (e.g. consists in) vectors of a deformation basis outputted by this neural network.

Additionally or alternatively, the deformation basis function may comprise (e.g. be) a function taking as input the input 3D modeled object and outputting geometric and/or physic spectral modes. The modes are vectors computed by the spectral decomposition of a quantity such as the input 3D modeled object's Laplacian or stiffness matrix, e.g. and eventually with added forces such as damping forces. In such a case, the basis comprises (e.g. consists in) these modes. These modes may be those of previously-cited reference (in case of the Laplacian) or those of previously-cited reference [3] (in case of the stiffness matrix), which are incorporated herein by reference.

Additionally or alternatively, the deformation basis function may comprise (e.g. be) a function taking as input the input 3D modeled object and outputting principal components of a PCA applied to a dataset of input 3D modeled objects with shared correspondences, the components forming uncorrelated deformation vectors. In such a case, the basis comprises (e.g. consists in) these vectors. These vectors may be those of previously-cited reference [7], which is incorporated herein by reference.

Additionally or alternatively, the deformation basis function may comprise (e.g. be) a function taking as input the input 3D modeled object and outputting handcrafted geometric modes. In such a case, the basis comprises (e.g. consists in) these modes. These modes may be those of previously-cited reference [3], which is incorporated herein by reference.

In examples, the deformation basis function is made of B smooth functions $V_1, \ldots, V_B$ from $\mathbb{R}^{3N}$ to $\mathbb{R}^{3N}$, these functions defining the deformations basis, where:

- $\forall i$, $V_i(X)$ outputs a normalized deformation vector which allows to locally deform the input 3D modeled object X in a plausible way, for any $X \in \mathbb{R}^{3N}$,
- optionally, $\langle V_i, V_j \rangle = 0$ $\forall i \neq j$, or more generally, the $V_i$ functions are uncorrelated and represent independent deformation modes. This improves efficiency of the determining method.

The functions may be linearly combined to infer local plausible deformations of the input 3D modeled object X. In other words, $$X + \sum_{i=1}^{B} \alpha_i V_i(X)$$

is a plausible 3D modeled object (e.g. 3D mesh or 3D point cloud) representing a deformation of the input X, where $\{\alpha_i\}_{i=1 \ldots B}$ is any set of weights small enough to ensure that the deformation remains local.

As previously discussed, the deformation vectors $V_i$ of the deformation basis may be any combination of:

- Vectors of the linear deformation basis outputted by a neural network learnable according to the learning method, e.g. a neural network learnt according to the learning method. In such a case, $\forall i$, $V_i(X) = g_w(f_w(X), X)_i$, where $g_w(f_w(.),.)$ is the neural network. For example, $f_w$ is an encoder configured to take as input a 3D modeled object and to output a latent vector representing the input 3D modeled object, and $g_w$ is a deep feedforward neural network configured to take as input a latent vector outputted by the encoder and to output a deformation basis of a 3D modeled object represented by the latent vector.
- Geometric and/or physic spectral modes: eigenvectors computed by the spectral decomposition of a quantity such as the input shape's Laplacian (such as the ones considered in previously-cited reference [12]) or stiffness matrix (such as the ones considered in previously-cited reference [3]), eventually with added forces (e.g. damping forces).

Principal components of a PCA applied to a dataset of input shapes with shared correspondences, resulting in uncorrelated deformation vectors (such as the ones considered in previously-cited reference [7]).

Handcrafted geometric modes: e.g.

$$V_i(X_j) = \begin{cases} (1+\beta)X_j & \text{if } j \% 3 = 0 \\ X_j & \text{else} \end{cases},$$

such the ones considered in previously-cited reference [3].

The determining of the second 3D modeled object is now discussed.

The determining of the second 3D modeled object comprises computing a trajectory. The trajectory is between the first 3D modeled object and a second 3D modeled object which respects the deformation constraint, i.e. which is a deformation of the first 3D modeled object meeting the (e.g. user-defined) deformation constraint. The trajectory is a trajectory of transitional 3D modeled objects. Each transitional 3D modeled object is a transitional deformation of the first 3D modeled object, i.e. respecting less the deformation constraint than the second 3D modeled object but respecting it more than a previous transitional 3D modeled object. Each transitional 3D modeled object is deformed into another one by a linear combination of the result of applying the deformation basis function to the transitional 3D modeled object. In other words, along the trajectory, each transitional 3D modeled object is deformed by being transformed into a linear combination of vectors of the deformation basis function applied to the transitional 3D modeled object. The linear combination is a local plausible linear deformation of the transitional 3D modeled object. In other words, the trajectory is a trajectory of successive deformations of the first 3D modeled object by successive linear combinations of vectors resulting from successive applications of the deformation basis function. In that respect, it is considered in the present disclosure that the trajectory deforms each transitional 3D modeled object, starting with the first 3D modeled object, by a linear combination of vectors of the deformation basis function applied to the transitional 3D modeled object, this deformation ultimately yielding the second 3D modeled object.

The trajectory reduces a loss. The loss may be user-defined, i.e. defined by a user, e.g. for the purpose of capturing non-respect of a deformation constraint provided/defined by the user. The loss penalizes an extent of non-respect of the deformation constraint by the deformed transitional 3D modeled object. In other words, the loss is a function of a transitional 3D modeled object which tends to have a low value when the transitional 3D modeled object tends to respect the deformation constraint, and which tends to have a high value when the 3D modeled object tends to not respect the deformation constraint. For example, the deformation constraint may be a 3D shape/sketch representing a deformation for the first 3D modeled object, and the loss may penalize a distance between the sketch and a transitional 3D modeled object. The trajectory reduces the loss, i.e. along the trajectory, the value of the loss applied to the transitional 3D modeled objects decreases (not necessarily strictly). In other words, along the trajectory, the transitional 3D modeled object respect more and more the deformation constraint, until reaching the second 3D modeled object which respects it best. For example the 3D modeled object tends to be close to a minimum of the loss.

The loss is any 3D loss L: $\mathbb{R}^{3N} \rightarrow \mathbb{R}_+$, N being the number of vertices or points of the first 3D modeled object, which penalizes the shapes that do not meet the deformation constraint, e.g. the intent of the user. As previously discussed, the user may for example draw a 3D sketch S representing a deformed shape (i.e. the deformation constraint) for the first 3D modeled object, and the loss L(X) may in this case be the sum of the distances between each point of the 3D sketch and its closest vertex on X:

$$L(X) = \sum_{s \in S} \min_{x \in X} d(x, s) + \lambda \rho(X),$$

where X is a 3D modeled object input of the loss, where d is any distance between 3D modeled objects (e.g. a Chamfer distance or an Earth-mover distance), and where ρ is an (optional, i.e. λ may equal 0) additional regularization term to enforce some constraints. For example, ρ(X) can enforce the symmetry:

$$\rho(X) = d(X, X_{symmetrized}).$$

The trajectory may correspond to an integral formula of the type:

$$X(t) = X(0) + \int_0^t \sum_{i=1}^{B} \alpha_i(u) V_i(X(u)) du, \ \{\alpha_i : \mathbb{R} \rightarrow \mathbb{R}\}_{i=1 \ldots, B},$$

where:

X(0) is the first 3D modeled object,

X(.) corresponds to a transitional 3D modeled object, $V_1(X(.)), \ldots, V_B(X(.))$ corresponds to the result of applying the deformation basis function to the transitional 3D modeled object, $V_1(.), \ldots, V_B(.)$ being the deformation basis function (each $V_i$ defining a coordinate of the function, the coordinate being a deformation vector function, i.e. that takes as input the input of the deformation basis function and that outputs a single deformation vector of this input), and $$\sum_{i=1}^{B} \alpha_i(\cdot) V_i(X(\cdot))$$

corresponds to the linear combination, $\alpha_1(.), \ldots, \alpha_B(.)$ being coefficients of the linear combination.

By "the trajectory corresponds to the integral formula", it is hereby meant that the computed trajectory tends to be captured by X(t). The determining method may compute this trajectory exactly, or, alternatively, the determining method may compute the trajectory by approximating X(t), e.g. for example by discretizing it, e.g. by any discretization method.

As a matter of fact, the computing may comprise discretizing the trajectory by computing a sequence of intermediate 3D modeled objects converging toward the second 3D modeled object and reducing the loss. This means that the sequence both converges and reduces the loss, i.e. the loss decreases (not necessarily strictly) along the sequence.

The discretization may use any discretization method (e.g. any suitable method for discretizing an integral trajectory). The discretizing is carried out in such a way that the sequence converges, its limit forming the second 3D modeled object, and reduces the loss.

Notably, the computing of the sequence may comprise, starting from the first 3D modeled object, iterations of:

- applying the deformation basis function to an intermediate 3D modeled object computed at the previous iteration, the applying yielding vectors (i.e. forming a basis of vectors each being a direction of deformation of the intermediate 3D modeled object);
- determining, among candidate deformations (i.e. possible linear deformations) of the intermediate 3D modeled object computed at the previous iteration each by a respective linear combination of the yielded vectors, a candidate deformation minimizing the loss; and
- selecting, as the next intermediate modeled object, the determined candidate deformation applied to the current intermediate 3D modeled object.

In other words, the computing of the sequence as just described iteratively computes intermediate 3D modeled objects each minimizing the loss among a set of possible linear combinations of deformation vectors outputted by the deformation basis function applied to the previously computed intermediate 3D modeled object. The minimizing of the loss may be carried out by any minimization method, for example any constrained or non-constrained minimization method.

The determining (i.e. among candidate deformations) of the candidate deformation minimizing the loss may explore candidate sets of coefficients of the respective linear combination and operate a selection among the explored candidate sets. In such a case, the selected set of candidate coefficients is respective to the determined candidate deformation. In other words, each minimization of the loss performed at a given iteration during the computing determines, among possible sets of coefficients, a set of linear combination coefficients which is such that the linear combination, with these coefficients, of deformation vectors outputted by the deformation basis function applied to the previously computed intermediate 3D modeled object, minimizes the loss. This linear combination forms the selected next intermediate 3D modeled object. This is an efficient manner of iteratively performing the computing.

The determining of the candidate deformation minimizing the loss may be carried out under the constraint that a norm (e.g. a L1 norm or a L2 norm) of each candidate set of coefficients is smaller than a predefined value. This means that at each minimizing of the loss, the minimization is carried out under the constraint that the determined set of coefficients must have a norm smaller than the predefined value. The predefined value may be a tradeoff parameter between convergence speed and result plausibility. This allows the coefficients of the selected linear combinations to remain small enough, in such a way that:

- the discretization yields a plausible non-linear deformation of the first 3D modeled object, and
- the minimization is forced to choose only the deformation vectors that, when linearly combined, deform an intermediate 3D modeled object closer to a 3D modeled object that tends to minimize best the loss. This allows the optimization to focus only on the most meaningful deformations instead of globally deforming the whole intermediate 3D modeled object, which could reach an optimized model too far from the first 3D modeled object.

The norm may in example be a L1-norm, which yields sparse selected sets of linear combination coefficients at each iteration. Each minimization may be carried out by any method, such as any constrained optimization method or any non-constrained optimization method, e.g. for example by turning the constraint into an additional penalty term used in such a non-constrained method.

In examples, the determining of the second 3D modeled object iteratively computes the trajectory (also referred to as "path") X(t) by approximating it by a sequence $(X_n)_{n \in \mathbb{N}}$ as follows:

$$X_n = X_0 + \sum_{j=0}^{n-1} \sum_{i=1}^{B} \alpha_{i,j} V_i(X_j), \text{ i.e.}$$

$$X_{n+1} = X_n + \sum_{i=1}^{B} \alpha_{i,n} V_i(X_n),$$

with a $\alpha_{i,j}$ small. For each time step n, the determining of the second 3D modeled object computes a set of amplitudes $\{\alpha_{i,n}\}_{i=1, \ldots, B}$ by solving a differentiable constrained optimizing, where the determining of the second 3D modeled object minimizes $$L(X_{n+1}) = L\left(X_n + \sum_{j=1}^{B} \alpha_{i,n} V_i(X_n)\right)$$

under the constraint $$\left\| \begin{pmatrix} \alpha_{1,n} \\ \vdots \\ \alpha_{B,n} \end{pmatrix} \right\| \leq \gamma$$

(the norm can be a L1 or a L2 norm for example) ensuring that the $\{\alpha_{i,n}\}_{i=1, \ldots, B}$ remain small enough:

- for the discretization to make sense (to get a plausible non-linear deformation instead of a large non plausible linear deformation)
- and also forcing the optimization to choose only the deformation modes that bring $X_n$ closer to the target (i.e. a 3D modeled object that minimizes the best the loss L), and thus focusing only on the most meaningful deformations instead of globally deforming the whole shape which would reach an optimized model too far from the initial 3D model $X_0$.

$\gamma$ is the predefined value, which here is a tradeoff parameter between convergence speed and result plausibility (e.g. in terms of deviation from a 3D shape manifold comprising the first 3D modeled object). For example, if the deformation basis is normalized, $\gamma$ may be smaller than $$\frac{1}{100}$$

of the shape's diagonal.

An implementation of the determining method is now discussed.

This implementation relates to the fields of 3D Modeling and 3D Editing. This implementation may be useful to fields such as virtual and augmented reality (more generally, any kind of immersive experience), video games, manufacturing and 3D printing, modeling. This implementation provides an improved solution to infer the optimal non-linear deformation of a 3D modeled object with respect to a user constraint, exploiting a linear deformation basis function (also referred to as a linear deformation field). Such a deformation basis function may be obtained from any method, for example with a geometric analysis or using machine learning techniques. For example, the deformation basis function may be a neural network learnable according to the learning method, for example having been learnt by the learning method (e.g. according to the previously-discussed implementation of the learning method). Given this deformation basis function, this implementation deforms an input 3D modeled object (i.e. the first 3D modeled object) in a large and plausible way in order to reach a second 3D modeled object fitting a user's constraint (e.g. a 3D sketch). The 3D modeled objects of this implementation are referred to as "3D meshes" for illustration purposes, but they may also be 3D point clouds, and this implementation could equally be performed with 3D point clouds instead of 3D meshes.

In this implementation, the local deformations basis is seen as the tangent space on the manifold of plausible 3D modeled objects. This implementation seeks an optimal 3D shape on this manifold meeting the requirements defined by the user's constraint. Thus, this implementation searches for the optimal velocity vector, i.e. the directional derivative of an optimal path on the manifold from the original mesh to the optimized edited mesh matching the user's constraint. This velocity can be "integrated" to retrieve the corresponding path. To do so, this implementation iteratively computes this path. At each time step, this implementation finds the deformation, thereby bringing the path closer to the target, as a linear combination of the vectors of the deformations basis at the current position on the manifold and makes a step along that vector.

This implementation can leverage a handcrafted deformation basis. This implementation produces large plausible deformations. This implementation optimally turns small linear deformations into large non-linear ones.

Let $X_0 \in \mathbb{R}^{3N}$ be the N vertices of the initial mesh that the user wants to edit. In this implementation, the deformation basis function is made of B smooth functions $V_1, \ldots, V_B$ from $\mathbb{R}^{3N}$ to $\mathbb{R}^{3N}$, these functions defining the deformations basis, where:

- $\forall i$, $V_i(X)$ outputs a normalized deformation vector which allows to locally deform the input 3D modeled object X in a plausible way, for any $X \in \mathbb{R}^{3N}$,
- optionally, $\langle V_i, V_j \rangle = 0$ $\forall i \neq j$, or more generally, the $V_i$ functions are uncorrelated and represent independent deformation modes. This improves efficiency of the determining method.

The functions may be linearly combined to infer local plausible deformations of the input 3D modeled object X. In other words, $$X + \sum_{i=1}^{B} \alpha_i V_i(X)$$

is a plausible 3D modeled object (e.g. 3D mesh or 3D point cloud) representing a deformation of the input X, where $\{\alpha_i\}_{i=1, \ldots, B}$ is any set of weights small enough to ensure that the deformation remains local.

As previously discussed, the deformation vectors $V_i$ of the deformation basis may be any combination of:

- Vectors of the linear deformation basis outputted by a neural network learnable according to the learning method, e.g. a neural network learnt according to the learning method. In such a case, $\forall_i$, $V_i(X) = g_w(f_w(X), X)_i$, where $g_w(f_w(.),.)$ is the neural network. For example, $f_w$ is an encoder configured to take as input a 3D modeled object and to output a latent vector representing the input 3D modeled object, and $g_w$ is a deep feedforward neural network configured to take as input a latent vector outputted by the encoder and to output a deformation basis of a 3D modeled object represented by the latent vector.
- Geometric and/or physic spectral modes: eigenvectors computed by the spectral decomposition of a quantity such as the input shape's Laplacian (such as the ones considered in previously-cited reference [12]) or stiffness matrix (such as the ones considered in previously-cited reference [3]), eventually with added forces (e.g. damping forces).
- Principal components of a PCA applied to a dataset of input shapes with shared correspondences, resulting in uncorrelated deformation vectors (such as the ones considered in previously-cited reference [7]).
- Handcrafted geometric modes: e.g.

$$V_i(X_j) = \begin{cases} (1+\beta)X_j & \text{if } j \,\%\, 3 = 0 \\ X_j & \text{else} \end{cases},$$

such as the ones considered in previously-cited reference [3].

The loss is any user-defined 3D loss L: $\mathbb{R}^{3N} \to \mathbb{R}_+$, N being the number of vertices or points of the first 3D modeled object, which penalizes the shapes that do not meet the intents of the user, as previously discussed. As previously discussed, the user may for example draw a 3D sketch S representing a deformed shape (i.e. the deformation constraint) for the first 3D modeled object, and the loss L(X) may in this case be the sum of the distances between each point of the 3D sketch and its closest vertex on X:

$$L(X) = \sum_{s \in S} \min_{x \in X} d(x, s) + \lambda \rho(X),$$

where X is an 3D modeled object input of the loss, where d is any distance between 3D modeled objects (e.g. a Chamfer distance or an Earth-mover distance), and where ρ is an (optional, i.e. λ may equal 0) additional regularization term to enforce some constraints. For example, ρ(X) can enforce the symmetry:

$$\rho(X) = d(X, X_{symmetrized}).$$

The linear local deformation vectors $\{V_i(X)\}_{i=1 \ldots B}$ can be seen as the basis of the tangent space at X, i.e. they can be used to define a directional derivative of path from $X_0$ to the optimal second 3D modeled object $X_\infty$. From one of the deformation basis' vector $V_i$, this implementation may derive a set of trajectories:

$$\left\{X(t)=X(0)+\int_0^t \alpha_i(u)V_i(X(u))du,\ \alpha_i:\mathbb{R}\to\mathbb{R}\right\}$$

$$X(t+dt)=X(t)+\alpha_i V_i(X(t))dt$$

$\alpha_i dt$ small $\Rightarrow \alpha_i V_i(X(t))dt$ is a local deformation and therefore plausible $\alpha_i$ defines the velocity of the trajectory.

By generalizing to B deformation vectors, this implementation may compute a trajectory among a set of plausible trajectories of the type:

$$\left\{X(t)=X(0)+\int_0^t \sum_{i=1}^{B}\alpha_i(u)V_i(X(u))du,\ \{\alpha_i:\mathbb{R}\to\mathbb{R}\}_{i=1\ldots B}\right\}.$$

Figure 3:
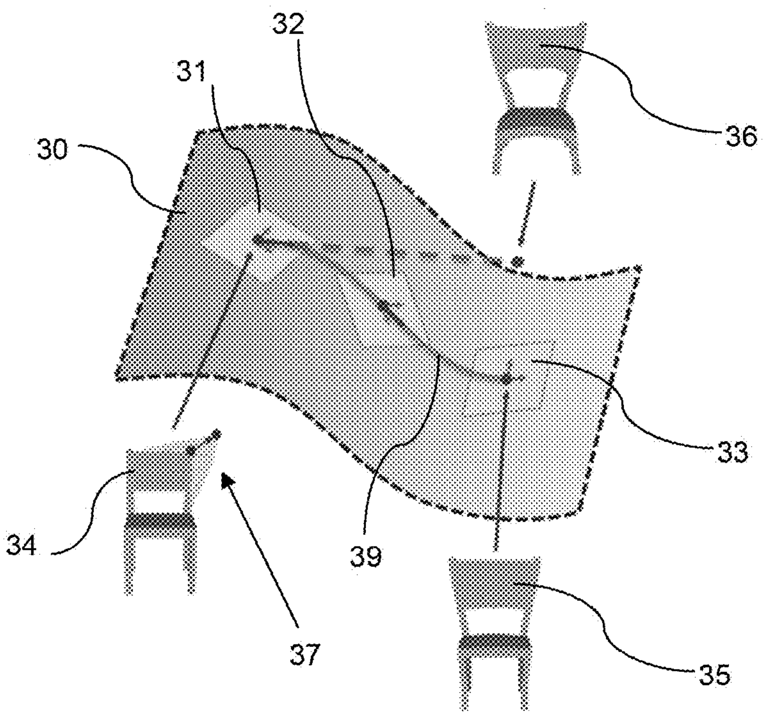
FIGS. 3 and 4 illustrate the method.

FIG. 3 illustrates the manifold 30 of plausible shapes, the tangent space with its basis at three different locations 31, 32, 33, and the directional derivatives of the path 39 from the original mesh/first 3D modeled object 34 to the optimized mesh/second 3D modeled object 35, which is a non-linear deformation of the original mesh 34. For the purpose of comparison, 36 shows a mesh resulting from a linear trajectory method for deforming 34. FIG. 3 further shows the deformation constraint 37.

This implementation seeks a set of functions $\{\alpha_i:\mathbb{R}\to\mathbb{R}\}_{i=1,\ldots,B}$ such that $$X(t)=X(0)+\int_0^t \sum_{i=1}^{B}\alpha_i(u)V_i(X(u))du:$$

converges when $t\to+\infty$ (always possible by setting $\alpha_i(t>T)=0\ \forall i$), converges to a mesh minimizing L $$(X_\infty)=L\left(X(0)+\int_0^\infty \sum_{i=1}^{B}\alpha_i(u)V_i(X(u))du\right).$$

This implementation carries out, for determining the second 3D modeled object, an algorithm that discretizes the trajectory, to iteratively compute the path X(t) by approximating by a sequence $(X_n)_{n\in\mathbb{N}}$ as follows:

$$X_n=X_0+\sum_{j=0}^{n-1}\sum_{i=1}^{B}\alpha_{i,j}V_i(X_j),\ \text{i.e.}$$

$$X_{n+1}=X_n+\sum_{i=1}^{B}\alpha_{i,n}V_i(X_n)$$

with a $\alpha_{i,j}$ small.

For each time step n, the algorithm computes a set of amplitudes $\{\alpha_{i,n}\}_{i=1,\ldots,B}$ by solving a differentiable constrained optimizing, where the algorithm minimizes $$L(X_{n+1})=L\left(X_n+\sum_{i=1}^{B}\alpha_{i,n}V_i(X_n)\right)$$

under the constraint $$\left\|\begin{pmatrix}\alpha_{1,n}\\ \vdots\\ \alpha_{B,n}\end{pmatrix}\right\|\le\gamma$$

(the norm can be a L1 or a L2 norm for example) ensuring that the $\{\alpha_{i,n}\}_{i=1,\ldots,B}$ remain small enough:

for the discretization to make sense (to get a plausible non-linear deformation instead of a large non plausible linear deformation)

and also forcing the optimization to choose only the deformation modes that bring $X_n$ closer to the target (i.e. the second 3D modeled object that minimize the best the loss L), and thus focusing only on the most meaningful deformations instead of globally deforming the whole shape which would reach an optimized model too far from the initial 3D model $X_0$.

$\gamma$ is a tradeoff parameter between convergence speed and result plausibility (in terms of deviation from the 3D shape manifold). For example, if the deformation basis is normalized, $\gamma$ may be smaller than $$\frac{1}{100}$$

of the shape's diagonal.

The gradient of this objective can be easily derived as follows:

$$\frac{\partial L(X_{n+1})}{\partial\alpha_{i,n}}=\nabla L(X_{n+1})\cdot V_i(X_n).$$

As the optimization ensures that $L(X_{n+1})\le L(X_n)\ \forall n$, convergence is guaranteed. It is to be noted that this constrained optimization problem can be solved with dedicated algorithms. Alternatively, the constraint may be turned into an additional penalty term to use non-constrained optimization methods.

Figure 4:
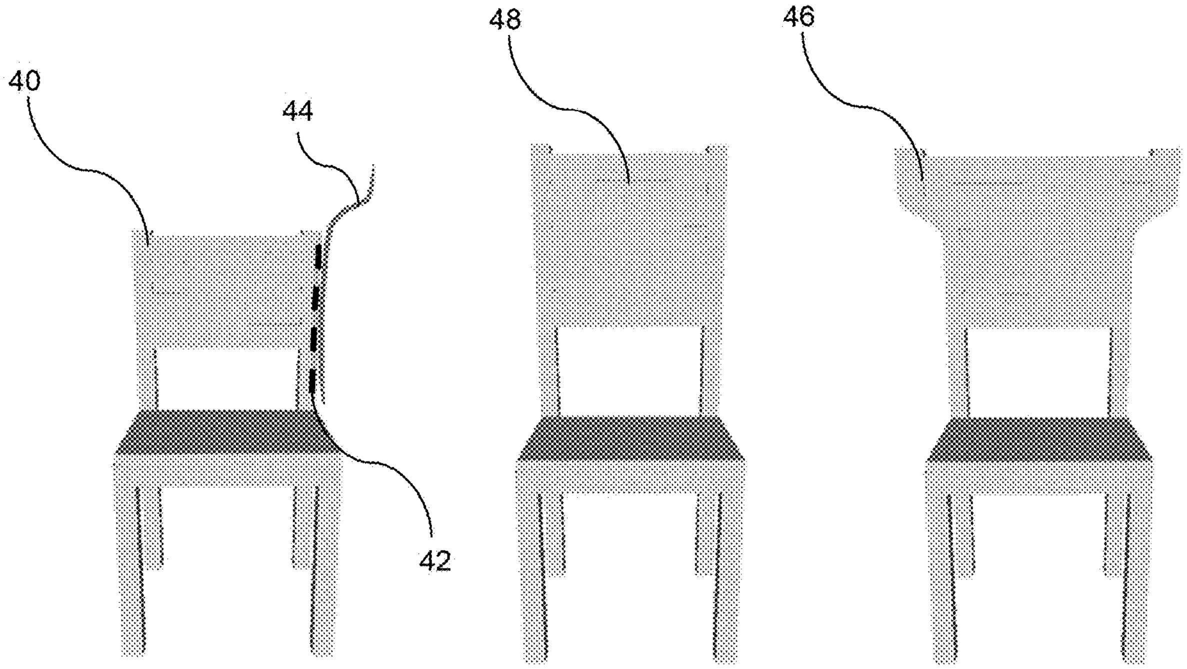

FIG. 4 shows an example of a result obtained by using this implementation. In this implementation, the user defines the deformation constraint on the first 3D modeled object/3D mesh 40 as follows: the user selects a part of the first 3D modeled object/3D mesh by drawing a sketch 42 and defines the deformation constraint by drawing another sketch 44. In this example, the loss is the sum of the squared distances between the mesh vertices closest to sketch 42, and their corresponding points in sketch 44. Corresponding points are computed as those whose curvilinear abscissa in their sketch is closest to that of the mesh vertices in sketch 42. Minimizing this loss effectively maps the part of the mesh selected by sketch 42 onto the other sketch 44. FIG. 4 shows the second 3D modeled object/3D mesh 46 determined by the method, and another 3D modeled object 48 representing a deformation of the first 3D modeled object 40 obtained by linear regression, for the purpose of comparison.

The determining method may be used in several applications. By "application, it is meant a computer-implemented method that includes the steps of the determining method and that may include further steps.

A first example of application of the determining method is 3D editing. The 3D editing may comprise (e.g. an iteration of):

the providing of a first 3D modeled object according to the determining method;

the providing of a deformation basis function (which may be the same for all iterations) according to the determining method;

the providing of a deformation constraint of the provided first 3D modeled object according to the determining method; and the determining of a second 3D modeled object which respects the deformation constraint according to the determining method, the determined second 3D modeled object forming for example a next first 3D modeled object, i.e. the first 3D modeled object of the next iteration.

A second example of application of the learning method is shape matching. The shape matching comprises providing two 3D meshes $e_1$ and $e_2$, one mesh $e_1$ forming the provided first 3D modeled object, the other mesh $e_2$ forming the provided deformation constraint. The two meshes may be close to each other, or alternatively, far from each other. The shape matching then comprises determining a second 3D modeled object according to the determining method, the second 3D modeled object being a 3D mesh that is a deformation of the first 3D mesh $e_1$ which matches or tends to match the second 3D mesh $e_2$.

The invention claimed is:

1. A computer-implemented method for determining a 3D modeled object deformation, the method comprising:

obtaining:

a deformation basis function configured for inferring a deformation basis of an input 3D modeled object, a first 3D modeled object, and a deformation constraint of the first 3D modeled object, the obtaining of the deformation constraint including defining a new geometrical shape of a part of the first 3D modeled object, by receiving, on a computer display which displays a 3D representation of the first 3D modeled object, one of the following graphical user inputs:

a clicking on or touching of the part of the first 3D modeled object and a moving of that part by a drag and drop operation, thereby defining the new geometrical shape of that part, the new geometrical shape forming the deformation constraint which is that the first 3D modeled object must be deformed to match the new geometrical shape; or a drawing of a 2D or 3D sketch representing the new geometrical shape of the part of the first 3D modeled object, the new geometrical shape forming the deformation constraint which is that the first 3D modeled object must be deformed to match the new geometrical shape, determining automatically, in response to obtaining the deformation constraint, a second 3D modeled object which respects the deformation constraint, the determining of the second 3D modeled object including computing a trajectory of transitional 3D modeled objects between the first 3D modeled object and the second 3D modeled object, the trajectory deforming each transitional 3D modeled object by a linear combination of the result of applying the deformation basis function to the respective transitional 3D modeled object, the trajectory reducing a loss penalizing an extent of non-respect of the deformation constraint by the deformed transitional 3D modeled object, wherein the loss includes a distance between the new geometrical shape and the deformed transitional 3D modeled object, wherein the trajectory corresponds to an integral formula of a type:

$$X(t) = X(0) + \int_0^t \sum_{i=1}^{B} \alpha_i(u) V_i(X(u)) du, \{\alpha_i : \mathbb{R} \to \mathbb{R}\}_{i=1,\ldots,B},$$

where:

$X(0)$ is the first 3D modeled object, $X(.)$ corresponds to a transitional 3D modeled object, $V_1(X(.)), \ldots, V_B(X(.))$ corresponds to the result of applying the deformation basis function to the transitional 3D modeled object, $V_1(.), \ldots, V_B(.)$ being the deformation basis function, $$\sum_{i=1}^{B} \alpha_i(.) V_i(X(.))$$

corresponds to a linear combination, $\alpha_1(.), \ldots, \alpha_B(.)$ being coefficients of the linear combination; and displaying the second 3D modeled object on the computer display.

2. The method of claim 1, wherein the computing further includes discretizing the trajectory by computing a sequence of intermediate 3D modeled objects converging toward the second 3D modeled object and reducing the loss.

3. The method of claim 2, wherein the computing of the sequence includes, starting from the first 3D modeled object, iterations of:

applying the deformation basis function to an intermediate 3D modeled object computed at a previous iteration, the applying yielding vectors;

determining, among candidate deformations of the intermediate 3D modeled object computed at the previous iteration each by a respective linear combination of the yielded vectors, a candidate deformation minimizing the loss; and selecting, as the next intermediate modeled object, the determined candidate deformation applied to a current intermediate 3D modeled object.

4. The method of claim 3, wherein the determining of the candidate deformation minimizing the loss explores candidate sets of coefficients of the respective linear combination and operates a selection among the explored candidate sets, the selected set of candidate coefficients being respective to the determined candidate deformation.

5. The method of claim 4, wherein the determining of the candidate deformation minimizing the loss is carried out under the constraint that a norm of each candidate set of coefficients is smaller than a predefined value.

6. The method of claim 5, wherein the norm is a L1 norm or a L2 norm.

7. The method of claim 1, wherein the obtaining of the deformation constraint of the first 3D modeled object comprises, by a user, defining the deformation constraint.

8. A non-transitory computer-readable data storage medium having recorded thereon a computer program comprising instructions for performing a method for determining a 3D modeled object deformation, the method comprising:

obtaining:

a deformation basis function configured for inferring a deformation basis of an input 3D modeled object, a first 3D modeled object, and a deformation constraint of the first 3D modeled object, the obtaining of the deformation constraint including defining a new geometrical shape of a part of the first 3D modeled object, by receiving, on a computer display which displays a 3D representation of the first 3D modeled object, one of the following graphical user inputs:

a clicking on or touching of the part of the first 3D modeled object and a moving of that part by a drag and drop operation, thereby defining the new geometrical shape of that part, the new geometrical shape forming the deformation constraint which is that the first 3D modeled object must be deformed to match the new geometrical shape; or a drawing of a 2D or 3D sketch representing the new geometrical shape of the part of the first 3D modeled object, the new geometrical shape forming the deformation constraint which is that the first 3D modeled object must be deformed to match the new geometrical shape, determining automatically, in response to obtaining the deformation constraint, a second 3D modeled object which respects the deformation constraint, the determining of the second 3D modeled object including computing a trajectory of transitional 3D modeled objects between the first 3D modeled object and the second 3D modeled object, the trajectory deforming each transitional 3D modeled object by a linear combination of the result of applying the deformation basis function to the respective transitional 3D modeled object, the trajectory reducing a loss penalizing an extent of non-respect of the deformation constraint by the deformed transitional 3D modeled object, wherein the loss includes a distance between the new geometrical shape and the deformed transitional 3D modeled object, wherein the trajectory corresponds to an integral formula of a type:

$$X(t) = X(0) + \int_0^t \sum_{i=1}^{B} \alpha_i(u) V_i(X(u))du, \{\alpha_i : \mathbb{R} \to \mathbb{R}\}_{i=1,..,B},$$

where:

X(0) is the first 3D modeled object,

X(.) corresponds to a transitional 3D modeled object, $V_1(X(.))$, . . . , $V_B(X(.))$ corresponds to the result of applying the deformation basis function to the transitional 3D modeled object, $V_1(.)$, . . . , $V_B(.)$ being the deformation basis function, $$\sum_{i=1}^{B} a_i(.)V_i(X(.))$$

corresponds to a linear combination, $\alpha_1(.)$, . . . , $\alpha_B(.)$ being coefficients of the linear combination; and displaying the second 3D modeled object on the computer display.

9. The non-transitory computer-readable data storage medium of claim 8, wherein the computing includes discretizing the trajectory by computing a sequence of intermediate 3D modeled objects converging toward the second 3D modeled object and reducing the loss.

10. The non-transitory computer-readable data storage medium of claim 9, wherein the computing of the sequence includes, starting from the first 3D modeled object, iterations of:

applying the deformation basis function to an intermediate 3D modeled object computed at a previous iteration, the applying yielding vectors;

determining, among candidate deformations of the intermediate 3D modeled object computed at the previous iteration each by a respective linear combination of the yielded vectors, a candidate deformation minimizing the loss; and selecting, as the next intermediate modeled object, the determined candidate deformation applied to a current intermediate 3D modeled object.

11. The non-transitory computer-readable data storage medium of claim 10, wherein the determining of the candidate deformation minimizing the loss explores candidate sets of coefficients of the respective linear combination and operates a selection among the explored candidate sets, the selected set of candidate coefficients being respective to the determined candidate deformation.

12. The non-transitory computer-readable data storage medium of claim 11, wherein the determining of the candidate deformation minimizing the loss is carried out under the constraint that a norm of each candidate set of coefficients is smaller than a predefined value.

13. A computer comprising:

a processor coupled to a memory, the memory having recorded thereon a computer program including instructions for determining a 3D modeled object deformation that when executed by the processor causes the processor to be configured to:

obtain:

a deformation basis function configured for inferring a deformation basis of an input 3D modeled object, a first 3D modeled object, and a deformation constraint of the first 3D modeled object, the processor being configured to obtain the deformation constraint by being configured to define a new geometrical shape of a part of the first 3D modeled object, by receiving, on a computer display which displays a 3D representation of the first 3D modeled object, one of the following graphical user inputs;

a clicking on or touching of the part of the first 3D modeled object and a moving of that part by a drag and drop operation, thereby defining the new geometrical shape of that part, the new geometrical shape forming the deformation constraint which is that the first 3D modeled object must be deformed to match the new geometrical shape; or a drawing of a 2D or 3D sketch representing the new geometrical shape of the part of the first 3D modeled object, the new geometrical shape forming the deformation constraint which is that the first 3D modeled object must be deformed to match the new geometrical shape, and determine, automatically, in response to the deformation constraint being obtained, a second 3D modeled object which respects the deformation constraint, wherein the processor is further configured to determine the second 3D modeled object by being configured to compute a trajectory of transitional 3D modeled objects between the first 3D modeled object and the second 3D modeled object, the trajectory deforming each transitional 3D modeled object by a linear combination of the result of applying the deformation basis function to the respective transitional 3D modeled object, the trajectory reducing a loss penalizing an extent of non-respect of the deformation constraint by the deformed transitional 3D modeled object, wherein the loss includes a distance between the new geometrical shape and the deformed transitional 3D modeled object, wherein the trajectory corresponds to an integral formula of a type:

$$X(t) = X(0) + \int_0^t \sum_{i=1}^{B} \alpha_i(u) V_i(X(u))du, \{\alpha_i : \mathbb{R} \to \mathbb{R}\}_{i=1,\ldots,B},$$

where:

X(0) is the first 3D modeled object,

X(.) corresponds to a transitional 3D modeled object, $V_1(X(.)), \ldots, V_B(X(.))$ corresponds to the result of applying the deformation basis function to the transitional 3D modeled object, $V_1(.), \ldots, V_B(.)$ being the deformation basis function, $$\sum_{i=1}^{B} \alpha_i(.) V_i(X(.))$$

corresponds to a linear combination, $\alpha_1(.), \ldots, \alpha_B(.)$ being coefficients of the linear combination; and displaying the second 3D modeled object on the computer display.

14. The computer of claim 13, wherein the processor is further configured to compute the trajectory by being configured to discretize the trajectory by being configured to compute a sequence of intermediate 3D modeled objects converging toward the second 3D modeled object and reducing the loss.

15. The computer of claim 14, wherein the processor is further configured to compute the sequence by being configured to, starting from the first 3D modeled object, implement iterations of being configured to:

apply the deformation basis function to an intermediate 3D modeled object computed at a previous iteration, the applying yielding vectors;

determine, among candidate deformations of the intermediate 3D modeled object computed at the previous iteration each by a respective linear combination of the yielded vectors, a candidate deformation minimizing the loss; and select, as the next intermediate modeled object, the determined candidate deformation applied to a current intermediate 3D modeled object.

16. The computer of claim 15, wherein the processor is further configured to determine the candidate deformation minimizing the loss by being configured to explore candidate sets of coefficients of the respective linear combination and operate a selection among the explored candidate sets, the selected set of candidate coefficients being respective to the determined candidate deformation.

17. The computer of claim 16, wherein the processor is further configured to determine the candidate deformation minimizing the loss by being configured to carry out under the constraint that a norm of each candidate set of coefficients is smaller than a predefined value.

* * * * *